(12) United States Patent
Prendergast

(10) Patent No.: US 11,378,056 B2
(45) Date of Patent: Jul. 5, 2022

(54) ENERGY GENERATING SYSTEM AND A METHOD FOR GENERATING ENERGY FROM A SEA TIDE

(71) Applicant: Patrick Joseph Prendergast, County Meath (IE)

(72) Inventor: Patrick Joseph Prendergast, County Meath (IE)

( * ) Notice: Subject to any disclaimer, the term of this patent is extended or adjusted under 35 U.S.C. 154(b) by 212 days.

(21) Appl. No.: 16/491,927

(22) PCT Filed: Mar. 7, 2018

(86) PCT No.: PCT/IE2018/000002
§ 371 (c)(1),
(2) Date: Sep. 6, 2019

(87) PCT Pub. No.: WO2018/163145
PCT Pub. Date: Sep. 13, 2018

(65) Prior Publication Data
US 2021/0277864 A1     Sep. 9, 2021

(30) Foreign Application Priority Data

Mar. 7, 2017  (IE) .................................. 2017/0052
Jul. 12, 2017  (IE) .................................. 2017/0142

(51) Int. Cl.
*F03B 13/26*     (2006.01)
*E02B 9/02*      (2006.01)
(Continued)

(52) U.S. Cl.
CPC .............. *F03B 13/264* (2013.01); *E02B 9/02* (2013.01); *F03B 7/00* (2013.01); *F03B 13/268* (2013.01); *E02B 9/08* (2013.01)

(58) Field of Classification Search
CPC ...... F03B 13/264; F03B 13/268; F03B 13/12; E02B 7/50; E02B 7/00; E02B 9/08; E02B 9/02
See application file for complete search history.

(56) References Cited

U.S. PATENT DOCUMENTS 3,993,913 A    11/1976  Dickman
4,053,787 A *  10/1977  Diggs ..................... F03B 7/00
                                                 290/54

(Continued)

FOREIGN PATENT DOCUMENTS

BE          357648 A      2/1929
CN       204212910 U      3/2015
(Continued)

OTHER PUBLICATIONS

Translation of the description of DE 88,676 C; included in IDS dated Sep. 9, 2021 (Year: 1896).*
(Continued)

*Primary Examiner* — Courtney N Heinle
*Assistant Examiner* — Ryan C Clark
(74) *Attorney, Agent, or Firm* — Sughrue Mion, PLLC

(57) ABSTRACT

An energy generating system includes a dam in an estuary defining a water containment area. The dam includes a plurality of dam elements, each including a plurality of dam panels hingedly connected in series, which are urgeable from an inoperative folded state in a chamber to an operative state by a corresponding pair of main or secondary buoyancy tanks as the tide rises and falls. Each pair of main buoyancy tanks with the corresponding dam element defines a water race within which a water wheel is located. The water wheels are mounted on corresponding drive shafts which are connected in series and which are rotatably carried on support frameworks which are supported on the main buoyancy tanks. Electricity generators are supported on carrier
(Continued)

Figure 1:
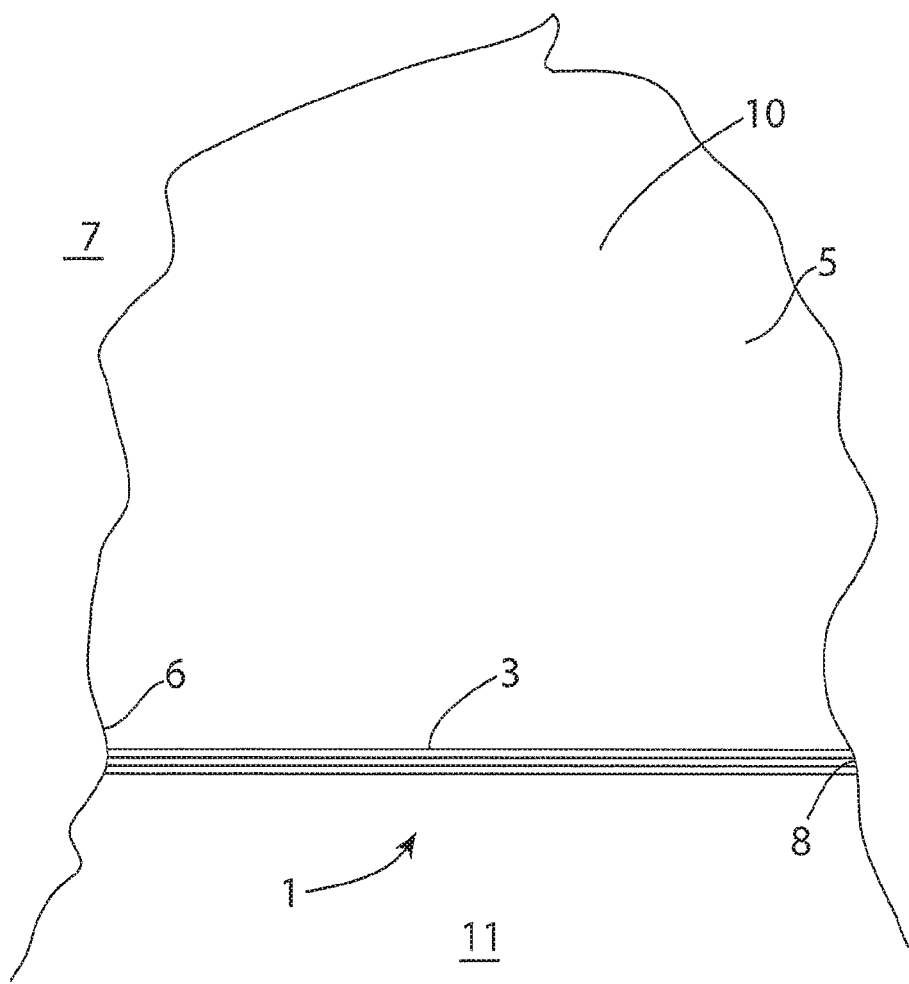

frameworks which are supported on the secondary buoyancy tanks at respective ends of the dam, and are driven by the adjacent one of the drive shafts.

20 Claims, 16 Drawing Sheets

(51) Int. Cl.
*F03B 7/00* (2006.01)
*E02B 9/08* (2006.01)

(56) References Cited

U.S. PATENT DOCUMENTS

| | | | | |
|---|---|---|---|---|
| 4,464,080 | A * | 8/1984 | Gorlov | F03B 13/266 |
| | | | | 405/76 |
| 5,154,537 | A * | 10/1992 | DeVries | E02B 3/02 |
| | | | | 405/211 |
| 8,251,612 | B2 * | 8/2012 | Hartman | F03B 13/1845 |
| | | | | 405/68 |
| 9,267,254 | B2 * | 2/2016 | Gujer | E02B 8/00 |
| 10,174,474 | B2 * | 1/2019 | Hamada | E02B 3/062 |
| 2005/0052031 | A1 | 3/2005 | Atiya | |
| 2019/0218737 | A1 * | 7/2019 | Hansmann | F03B 17/04 |

FOREIGN PATENT DOCUMENTS

| | | |
|---|---|---|
| DE | 88676 C | 9/1896 |
| EP | 1 548 276 A1 | 6/2005 |
| EP | 2 687 717 A2 | 1/2014 |
| FR | 2 865 226 A1 | 7/2005 |
| FR | 3 018 291 A1 | 9/2015 |
| FR | 3 028 297 A1 | 5/2016 |
| JP | 3174457 U | 3/2012 |

OTHER PUBLICATIONS

International Search Report for PCT/IE2018/000002 dated Jul. 9, 2018 (PCT/ISA/210).
Written Opinion for PCT/IE2018/000002 dated Jul. 9, 2018 (PCT/ISA/237).

* cited by examiner

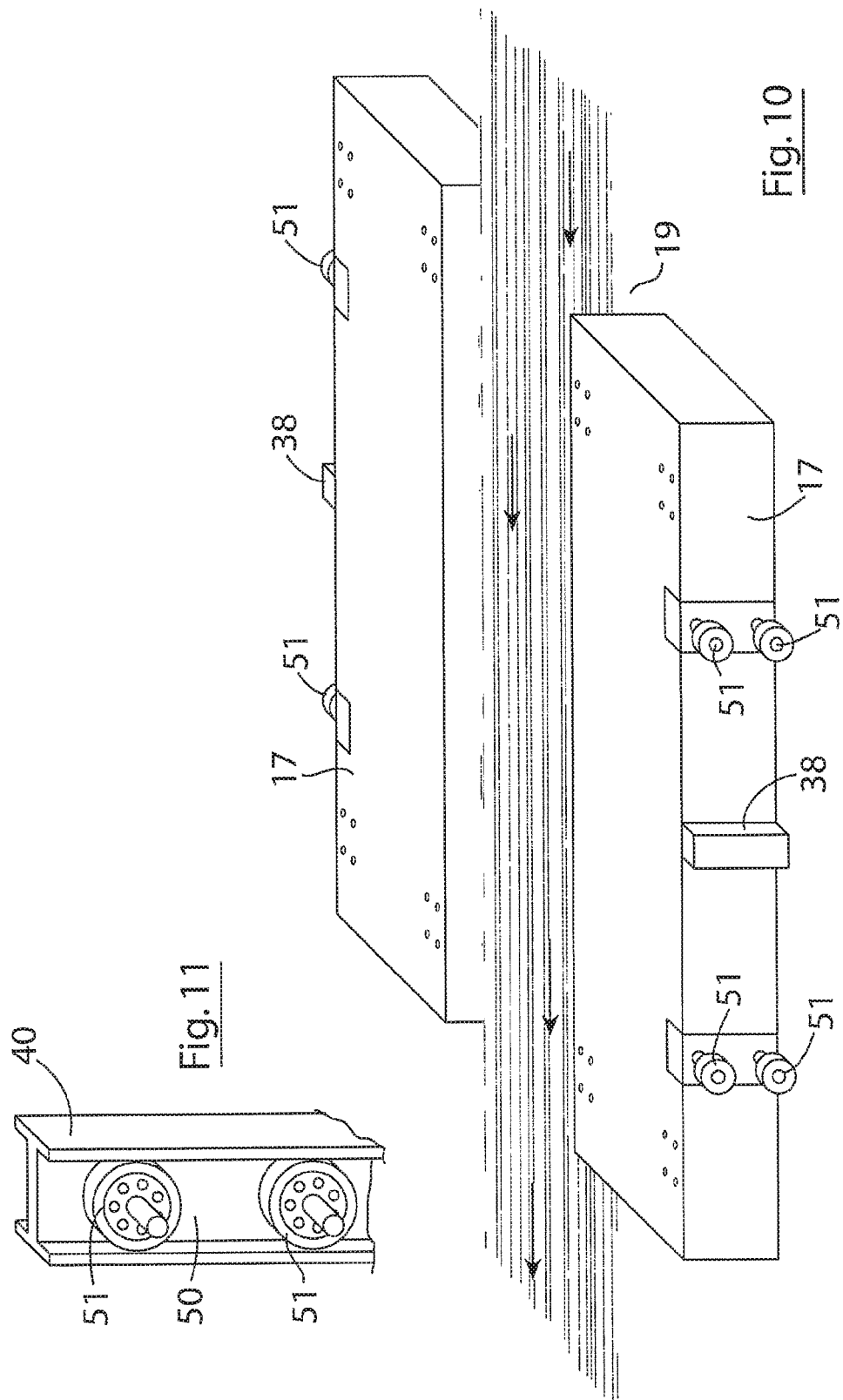

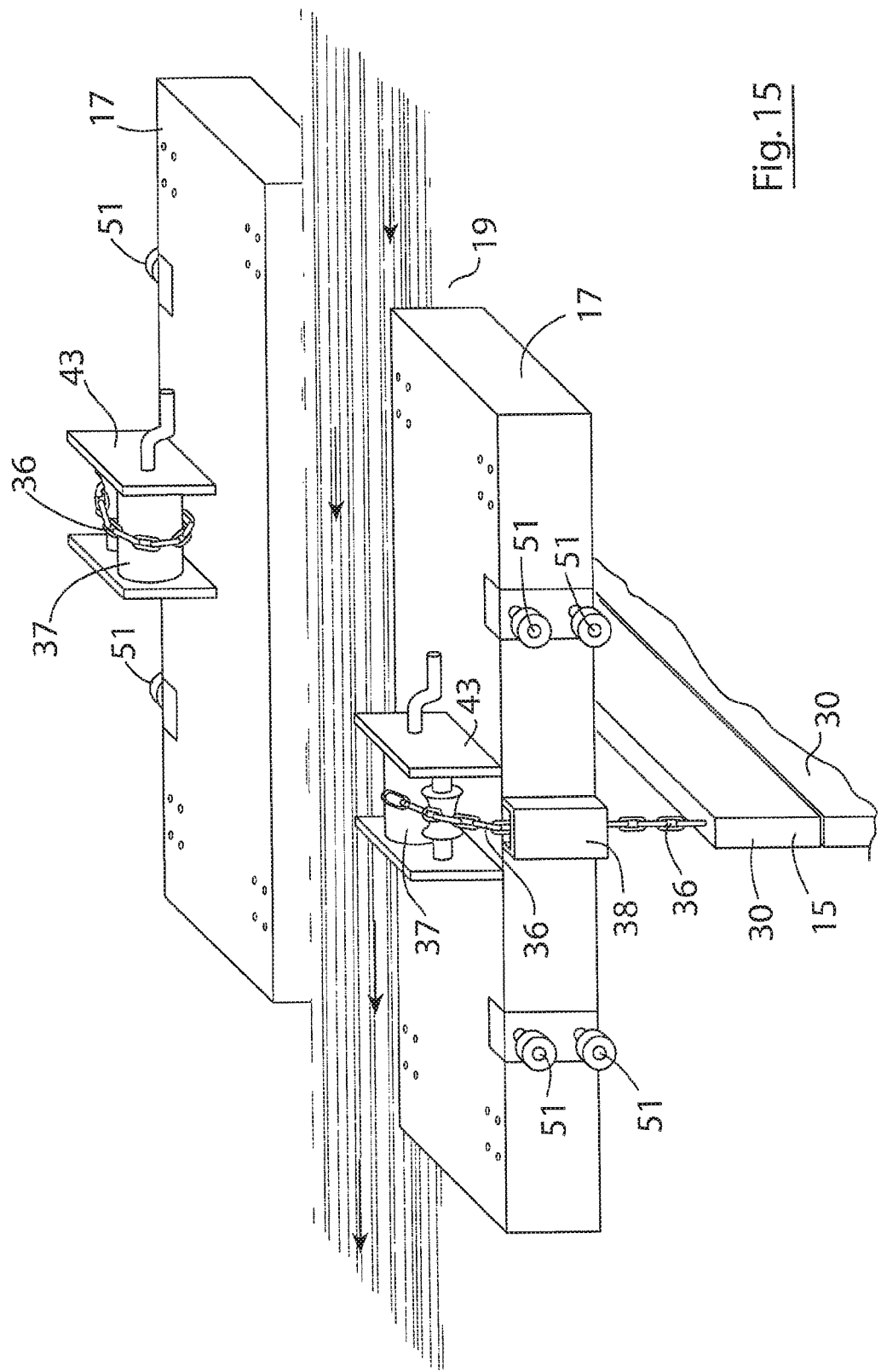

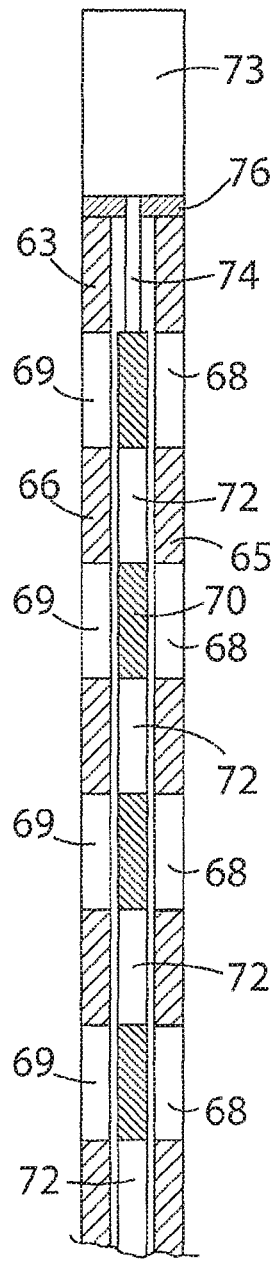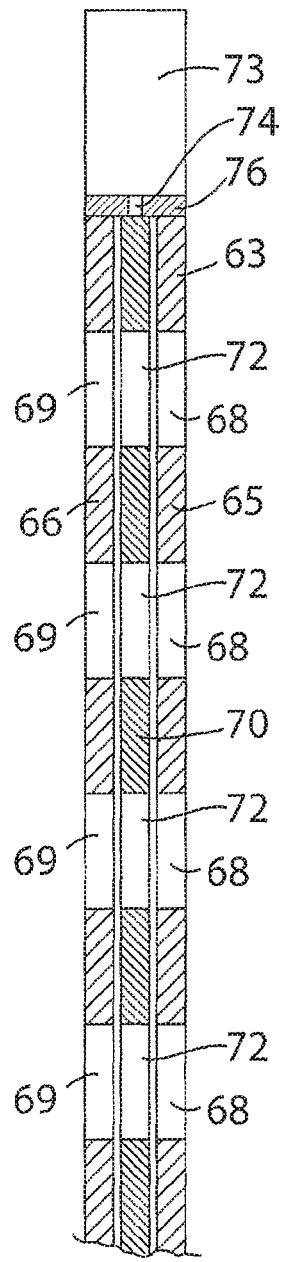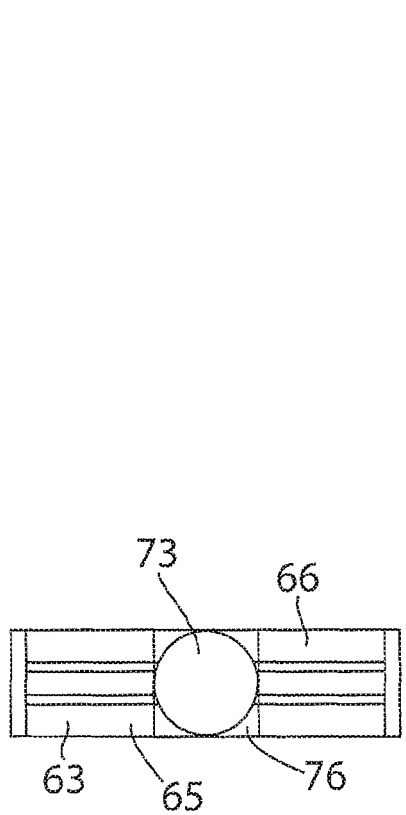
Fig. 23
Fig. 21    Fig. 22

ENERGY GENERATING SYSTEM AND A METHOD FOR GENERATING ENERGY FROM A SEA TIDE

CROSS REFERENCE TO RELATED APPLICATIONS

This application is a National Stage of International Application No. PCT/IE2018/000002 filed Mar. 7, 2018, claiming priority based on Irish Patent Application Nos. S2017/0052 filed Mar. 7, 2017 and S2017/0142 filed Jul. 12, 2017, the disclosures of all of which are incorporated herein by reference.

The present invention relates to an energy generating system and in particular, the invention relates to an energy generating system for generating energy from a sea tide. The invention also relates to a method for generating energy from a sea tide.

Sea tides rise and fall twice every twenty-five hours approximately. Depending on the location, the water level differential between high and low tide levels can be as high as twelve meters. Such tides comprise a significant amount of energy, and harnessing such energy would significantly reduce the dependency on other sources of energy, for example, the burning of fossil fuel, nuclear energy and the like.

There is therefore an need for an energy generating system for generating energy from a sea tide, and there is also a need for a method for generating energy from a sea tide.

The present invention is directed towards providing such an energy generating system and a method.

According to the invention there is provided an energy generating system for generating energy from a sea tide comprising a dam configured to isolate a water containment area from a sea, the dam comprising at least one variable height dam element, a buoyancy means co-operable with each dam element and configured to control the height of the corresponding dam element in response to a level of water, the dam element being configured to define a water race between the water containment area and the sea to allow water flow therethrough between the sea and the water containment area, a water wheel operably located in each water race configured to produce usable energy.

Preferably, each buoyancy means is configured to progressively rise the corresponding dam element in response to a rising tide. Advantageously, each buoyancy means is configured to progressively lower the corresponding dam element in response to a falling water level of the water in the water containment area.

In one aspect of the invention each buoyancy means extends transversely relative to the corresponding dam element on at least one side of the dam element. Preferably, each buoyancy means extends transversely relative to the corresponding dam element on respective opposite sides thereof.

In another aspect of the invention at least one main guide means is configured to guide each dam element in a generally upwardly and downwardly direction.

In another aspect of the invention a pair of spaced apart upstanding support members are provided extending upwardly from a sea bed for supporting each dam element therebetween, and a main sealing means is provided for forming a seal between each dam element and the corresponding upstanding support members. Preferably, each dam element and the corresponding buoyancy means are configured to move relative to the pair of upstanding support members.

Advantageously, the main guide means extend longitudinally along at least one of the upstanding support members.

In one aspect of the invention each upstanding support member defines a corresponding one of the main guide means of the corresponding upstanding support member as a corresponding elongated main guide slot.

Preferably, each dam element comprises one of a flexible membrane and a plurality of dam panels hingeadly connected in series. Advantageously, each dam element comprises the plurality of the hingeadly connected dam panels, the dam panels of each dam element being moveable in a concertina manner between an inoperative folded state with the dam panels lying side by side and parallel to each other and an operative state with the dam panels substantially aligned with each other to form the dam element. Ideally, a plurality of secondary sealing means are provided for forming seals between the respective dam panels when the corresponding dam element is in the operative state.

Preferably, each dam panel of each dam element comprises one of the secondary sealing means for sealing the dam panel to an adjacent one of the dam panels in the operative state.

In one aspect of the invention the dam panels of each dam element are configured to be progressively drawn from the folded state into the operative state in response to upward movement of the corresponding buoyancy means, and the dam panels are progressively returned from the operative state to the folded state in response to downward movement of the corresponding buoyancy means.

In another aspect of the invention the dam panels of each dam element are weighted to return to the folded state under gravity, in response to downward movement of the corresponding buoyancy means.

Preferably, the dam panels of each dam element are stored in the folded state in a corresponding chamber. Advantageously, the chamber of each dam element in which the dam panels thereof are stored in the folded state is located adjacent the sea bed. Preferably, the chamber of each dam element in which the dam panels thereof are stored in the folded state is recessed into the sea bed.

In another aspect of the invention an uppermost one of the dam panels of each dam element is sealably coupled to the corresponding buoyancy means. Preferably, the uppermost one of the dam panels of each dam element is adjustably coupled to the corresponding buoyancy means such that the spacing between the buoyancy means and the uppermost dam panel is variable.

Preferably, the dam panels of each dam element are moveable within the corresponding main guide means. Advantageously, the dam panels of each dam element are sealably and slideably engageable in the corresponding main guide means.

In one aspect of the invention a secondary guide means is provided for guiding each buoyancy means as the buoyancy means rises and falls in response to the rising and falling water levels.

In another aspect of the invention each buoyancy means defines with the corresponding dam element the corresponding water race.

In a further aspect of the invention each buoyancy means comprises a pair of spaced apart buoyancy tanks. Preferably, the buoyancy tanks of each pair thereof define with the corresponding dam element, the corresponding water race.

In another aspect of the invention each water wheel is configured to rotate in one direction in response to a rising tide, and to rotate in the opposite direction in response to a falling tide. Preferably, each water wheel comprises a plurality of circumferentially spaced apart water engaging elements located on the water wheel and configured to extend into the corresponding water race. Advantageously, the water engaging elements are equi-spaced apart circumferentially around the periphery of the corresponding water wheel.

In one aspect of the invention each water engaging element defines a hollow interior region. Preferably, the hollow interior region of each water engaging element is evacuated to a pressure below atmospheric pressure.

In another aspect of the invention each water engaging element is radially spaced apart outwardly from the periphery of the corresponding water wheel.

In another aspect of the invention each water wheel is supported on the corresponding buoyancy means.

Preferably, each water wheel is rotatably carried on the corresponding buoyancy means.

Advantageously, each water wheel is supported on the corresponding buoyancy means such that the water wheel is continuously operably located in the corresponding water race.

In another aspect of the invention each water wheel is rotatably carried on a support means mounted on the corresponding buoyancy means.

In a further aspect of the invention each water wheel is mounted fast on a drive shaft rotatably supported on the corresponding buoyancy means. Preferably, the drive shaft of each water wheel is coupled one of directly and indirectly to an electricity generator.

In a further aspect of the invention a plurality of water races are defined by a plurality of corresponding dam elements, and the drive shafts of the water wheels corresponding to the respective dam elements are coupled in series, and are in turn coupled to the electricity generator.

In another aspect of the invention each drive shaft is coupled to the adjacent drive shaft by a flexible coupling.

Preferably, each drive shaft is coupled to the adjacent drive shaft by a universal joint.

In another aspect of the invention the dam comprises a plurality of spaced apart upstanding support members and a plurality of the dam elements located between respective adjacent pairs of the upstanding support members.

Preferably, each upstanding support member comprises a pair of spaced apart stanchions defining the main guide slot therebetween. Advantageously, the main sealing means comprises a pair of elongated sealing members extending from the respective stanchions into the corresponding main guide slot for sealably and slideably engaging the corresponding dam element in the operative state adjacent one end thereof.

In one aspect of the invention the dam is configured to extend from land at one side of an estuary to land at an opposite side of the estuary to define the water containment area in the estuary between the land and the dam.

In another aspect of the invention a sluice means is provided for selectively permitting water to flow through the dam bypassing the one or more water races. Preferably, the sluice means is located in the dam.

In one aspect of the invention the sluice means comprises a sluice panel having at least one sluice opening extending therethrough, and a closure means operable between a closed state closing the at least one sluice opening and an open state permitting water to flow through the at least one sluice opening. Preferably, the sluice panel extends generally upwardly from the sea bed.

Preferably, the sluice panel is sealably secured to the sea bed and extends between an adjacent pair of the upstanding support members and is sealably secured thereto.

In another aspect of the invention an urging means is provided for urging the closure means between the open and the closed states.

Preferably, the sluice panel comprises a plurality of spaced apart sluice openings, and the closure means comprises a closure panel comprising a plurality of communicating openings extending therethrough, the closure panel being slideable between the open state with the communicating opening aligned with the respective sluice openings, and the closed state closing the sluice openings.

Advantageously, the sluice openings in the sluice panel are equi-spaced apart vertically from each other.

Preferably, the closure panel is slideable in a generally vertical direction.

Advantageously, a pair of sluiced panels are provided spaced apart from each other and substantially parallel to each other with the closure panel located therebetween.

In another aspect of the invention each sluice panel is located between an adjacent pair of the upstanding support members.

In a further aspect of the invention a water level differential monitoring means for monitoring the water level differential on respective opposite sides of the dam is provided, and the closure means is urged into the open state in response to the monitored water level differential exceeding a predefined water level differential value.

Preferably, the water level differential monitoring means comprises a pair of level sensors for determining the difference in the level of water on the respective opposite sides of the dam.

In one aspect of the invention the urging means is responsive to the monitored water level differential exceeding the predefined water level differential value for urging the closure means from the closed state to the open state.

The invention also provides a dam for the energy generating system according to the invention.

The invention also provides a method for generating energy from a sea tide, the method comprising providing a dam to form a water containment area separated from the sea by the dam, locating at least one variable height dam element in the dam, coupling the dam element to a buoyancy means for controlling the height of the dam element in response to a level of water, configuring the dam element to define a water race between the water containment area and the sea to allow water to flow therethrough between the sea and the water containment area, and locating a water wheel in the water race to rotate in response to water flowing through the water race to produce useable energy.

The advantages of the invention are many. By virtue of the fact that the dam according to the invention of the energy generating system also according to the invention is of variable height, the energy generating system is continuously operable to continuously generate energy throughout all phases of the rising, falling and turning of a sea tide. Furthermore, by virtue of the fact that the dam element of the dam is of variable height and varies in response to water level, the energy generated by the energy generating system remains substantially constant for all states of the sea tide.

A further advantage of the invention lies in the fact that the energy generating system is located in an estuary, which can be located in a relatively sheltered location whereby the estuary, and in turn the energy generating system is protected from stormy conditions out at sea.

A further advantage of the invention is achieved when the dam is provided with the sluice means which allows for the control of the water level differential between the water levels on respective opposite sides of the dam. By limiting the water level differential to a predefined safe water level differential value, any danger to the integrity of the dam, which could arise as a result of an excessive water level differential, is avoided.

A further advantage of the invention is that the energy generating system according to the invention is a non-polluting system. It neither pollutes the water, nor does it pollute the air. Additionally, by generating electricity from tidal movement, once the capital cost of the energy generating system has been recovered, the only other costs in operating the system are maintenance and running costs. The raw material, namely, the tidal movement of the sea water for generating the electricity, is cost free.

Figure 2:
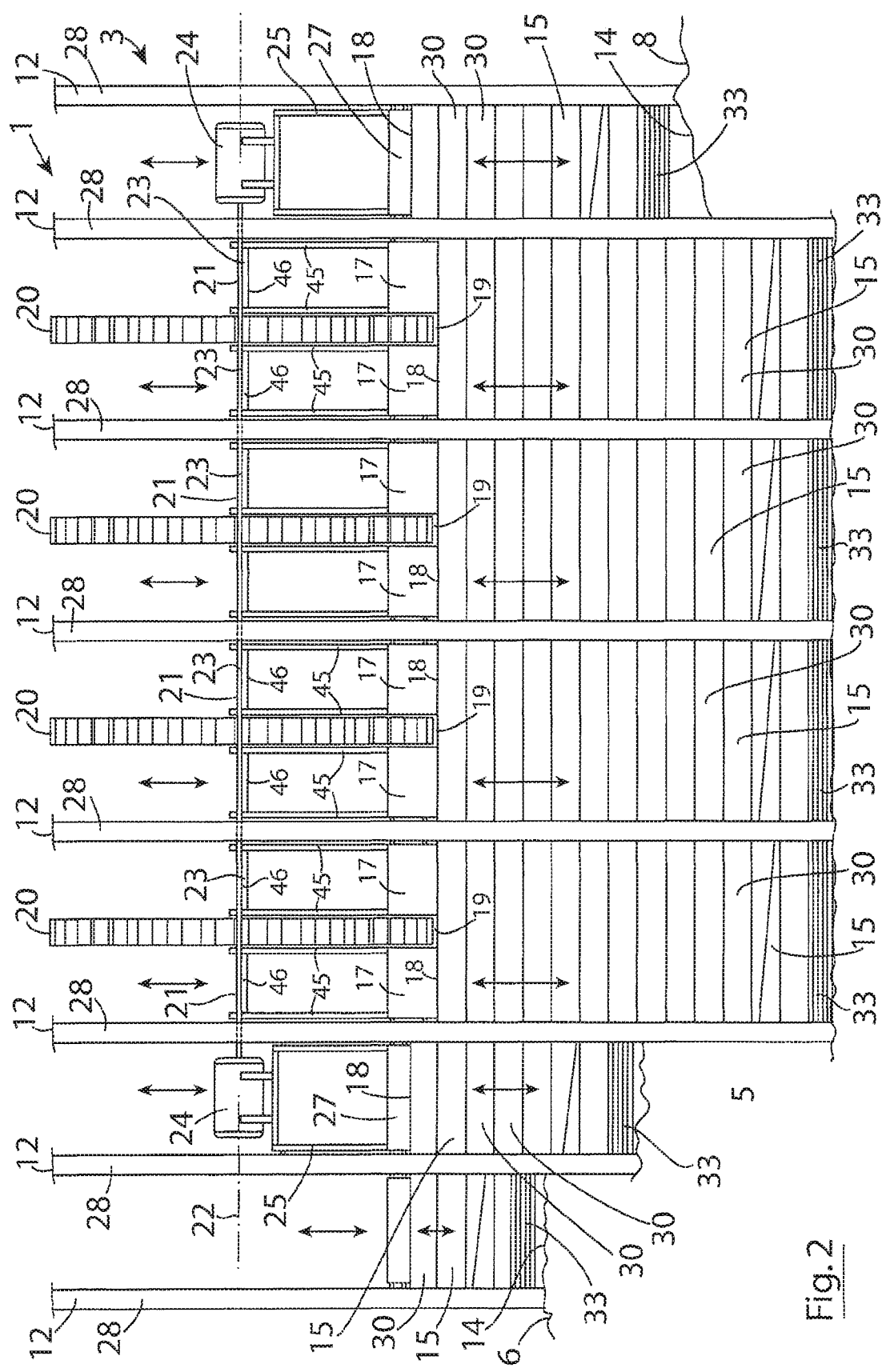
Figure 3:
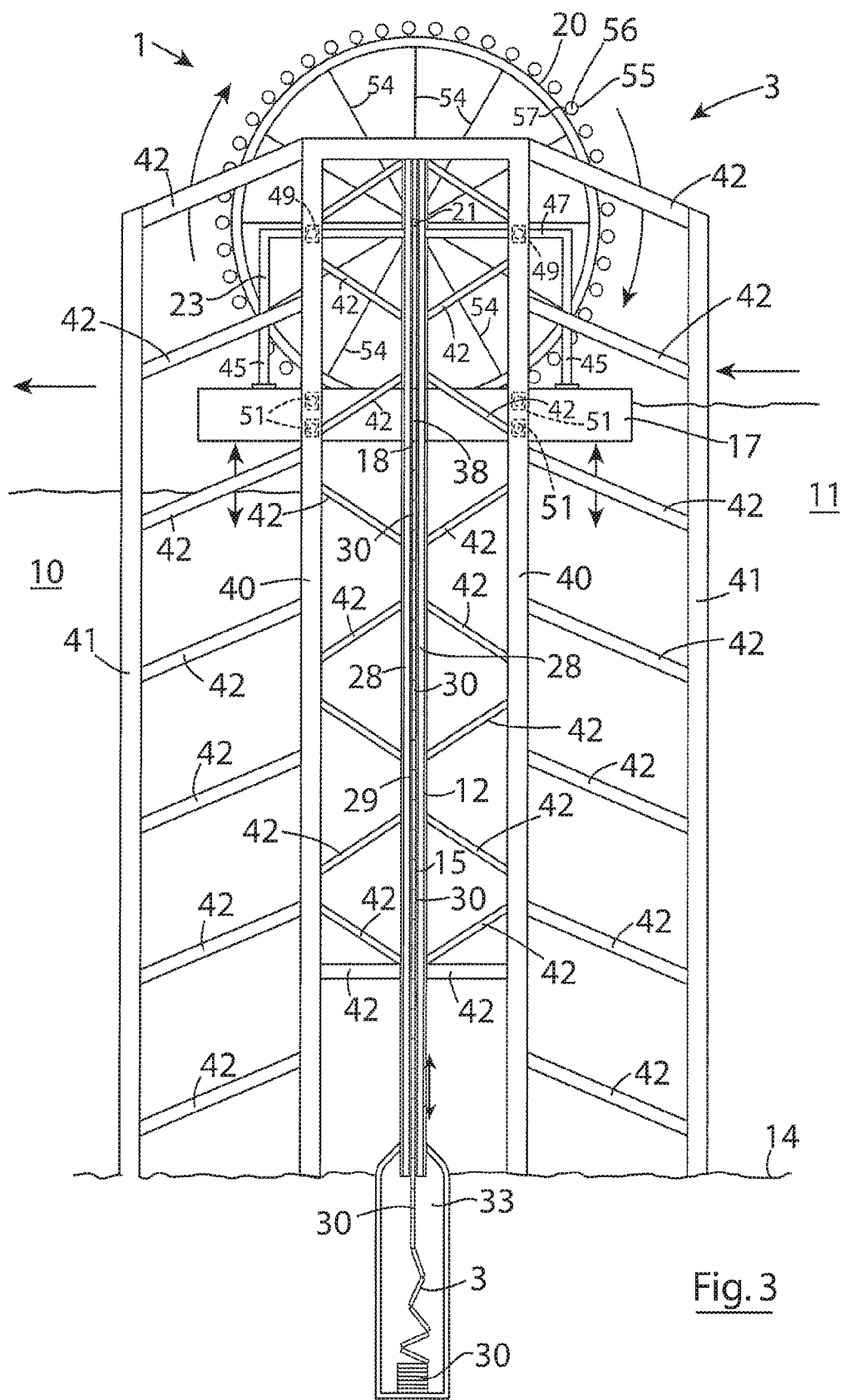
Figure 4:
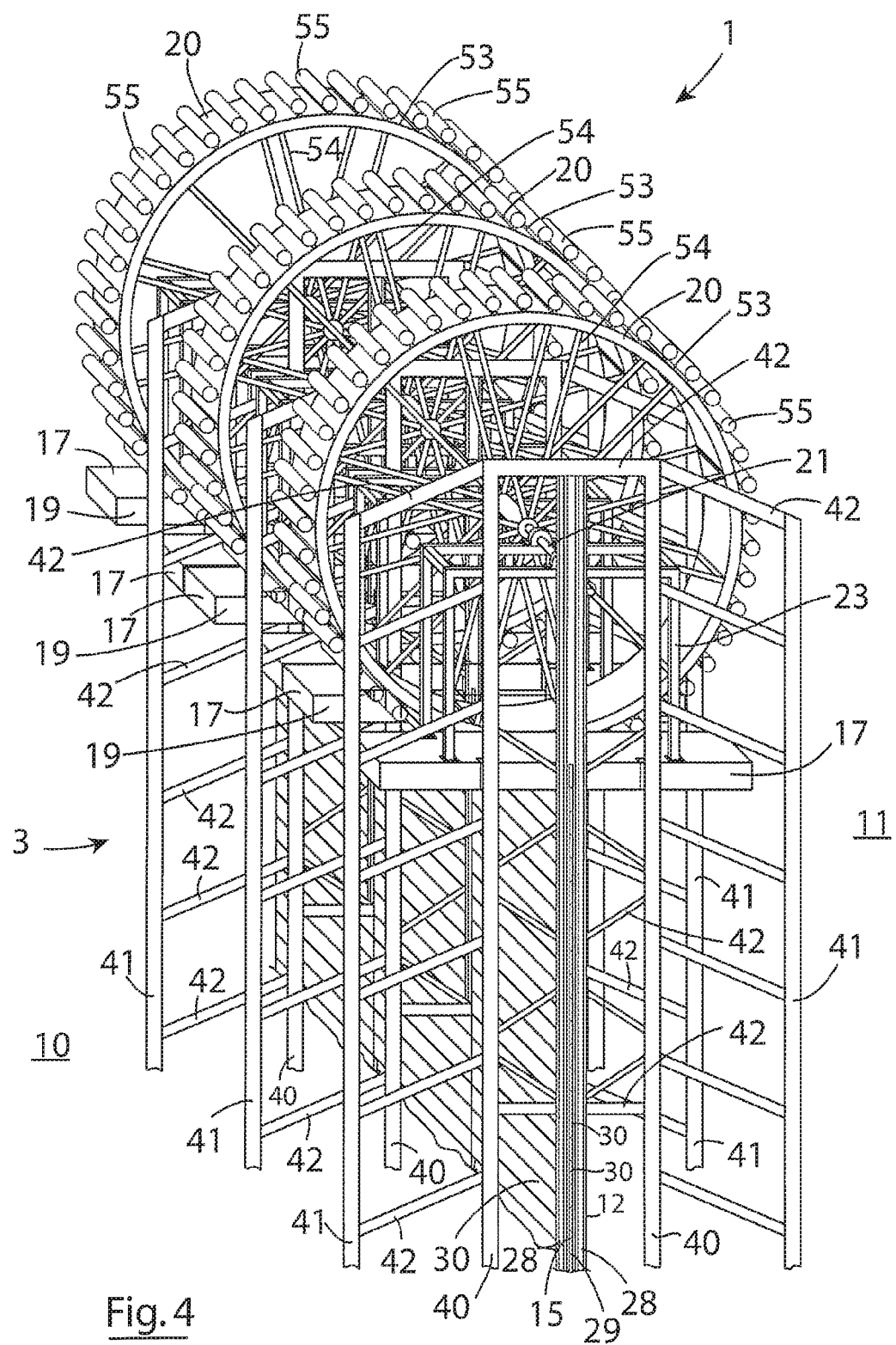
Figure 5:
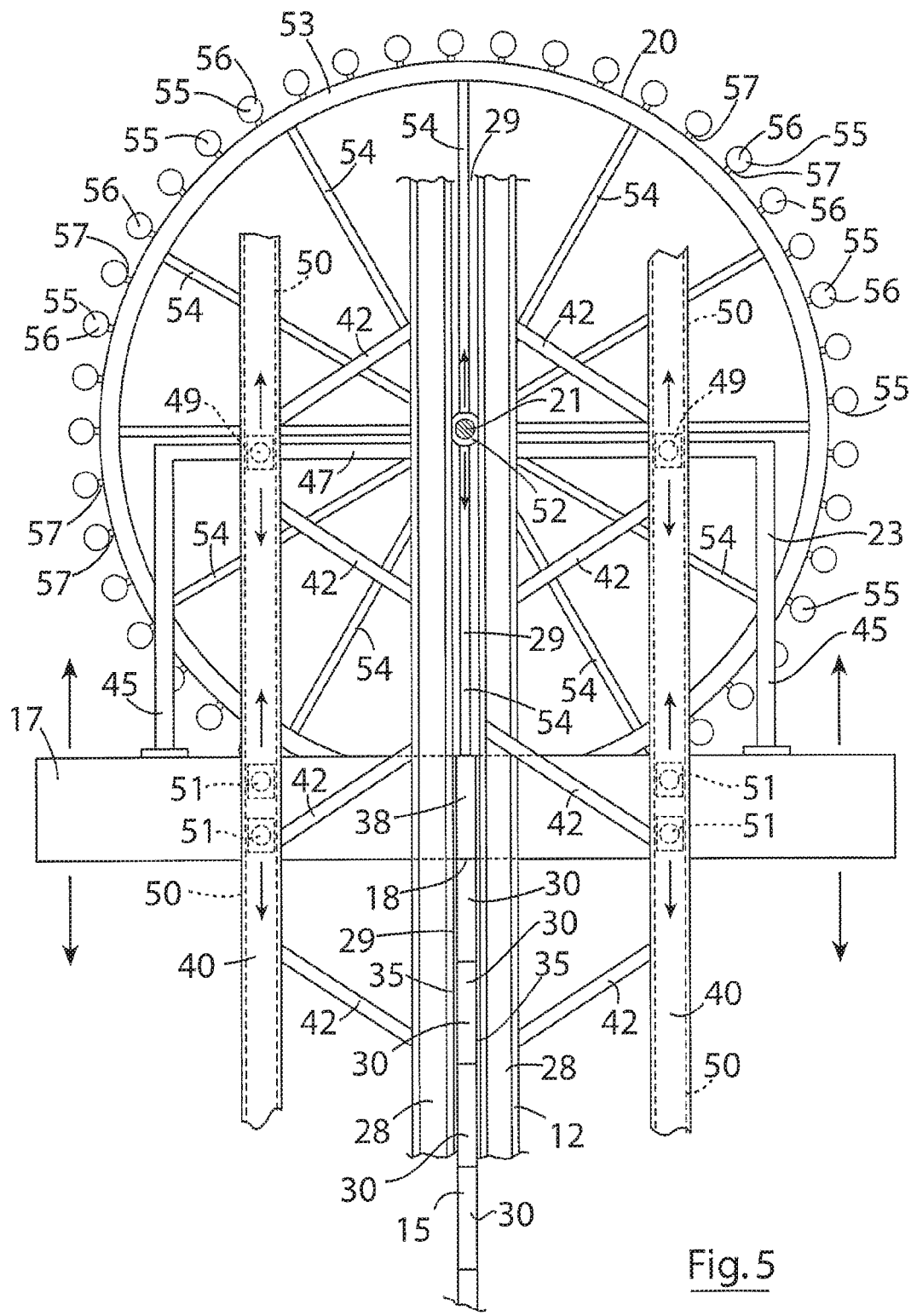
Figure 6:
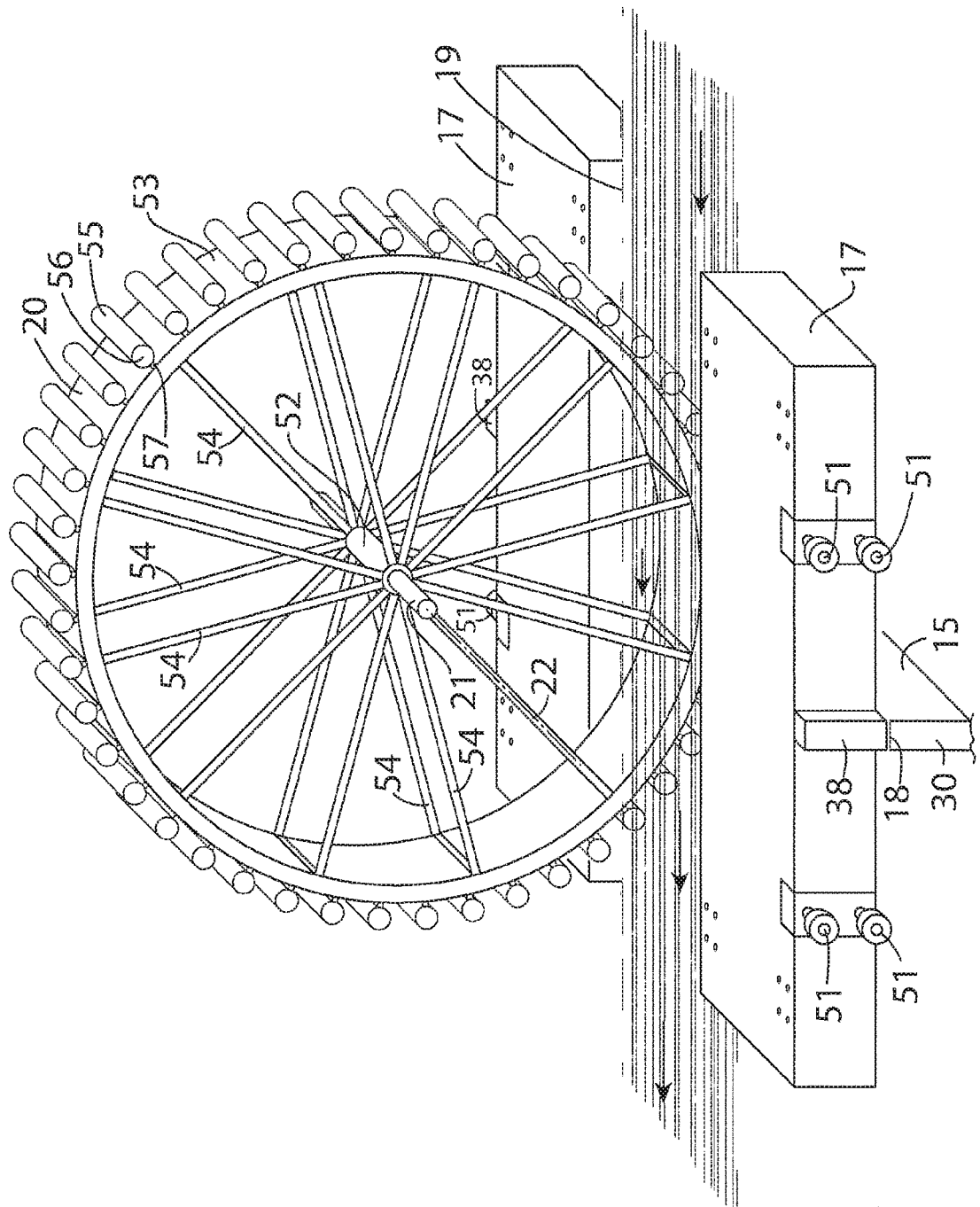
Figure 7:
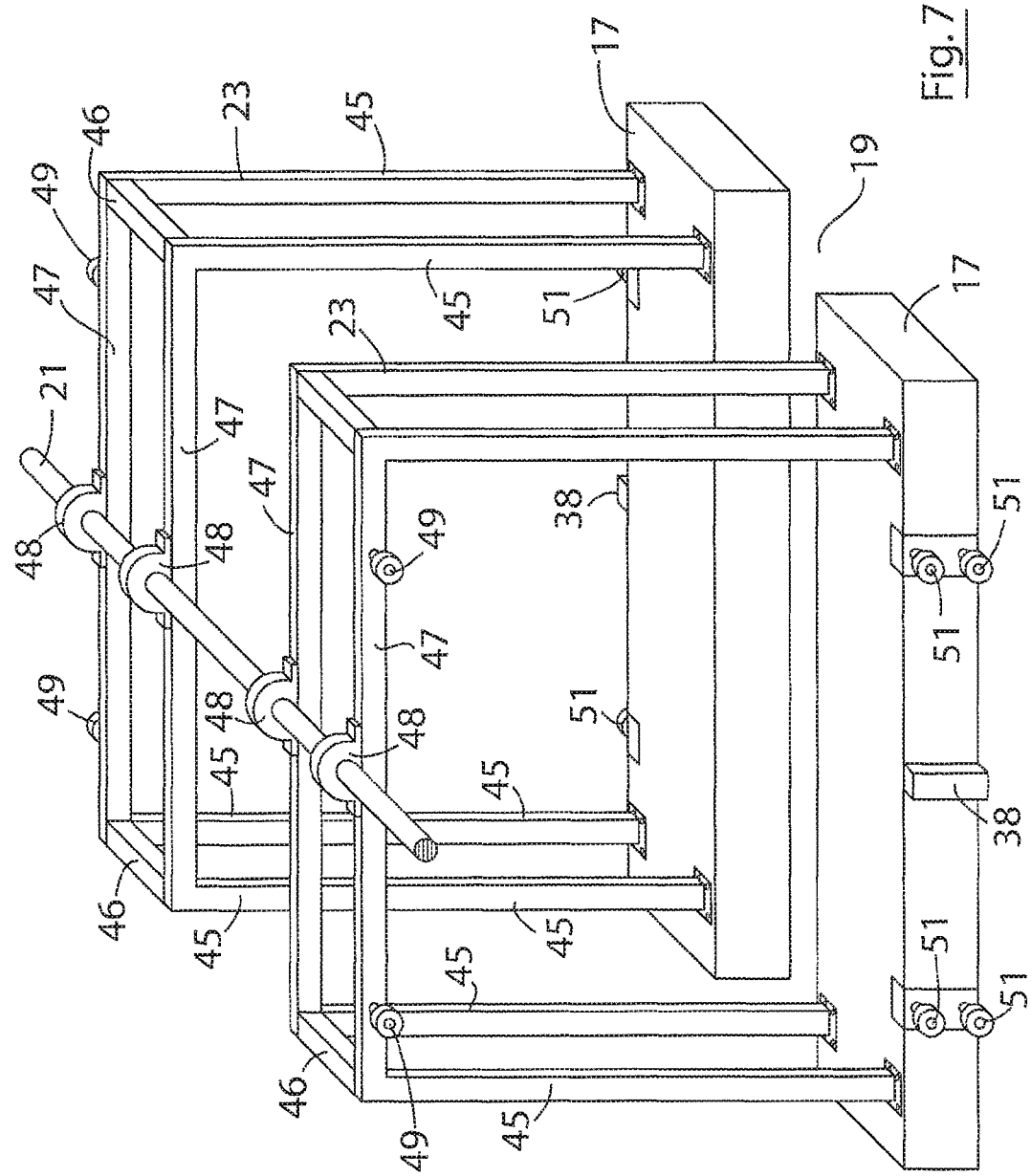
Figure 14:
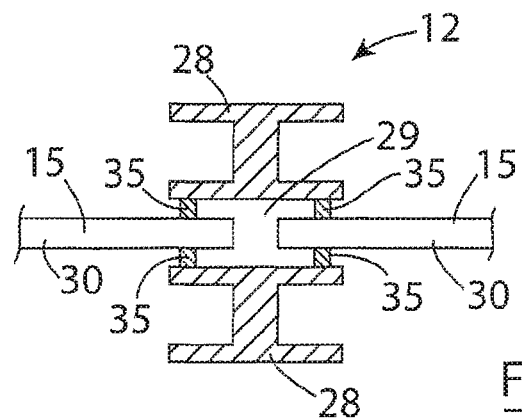
Figure 8:
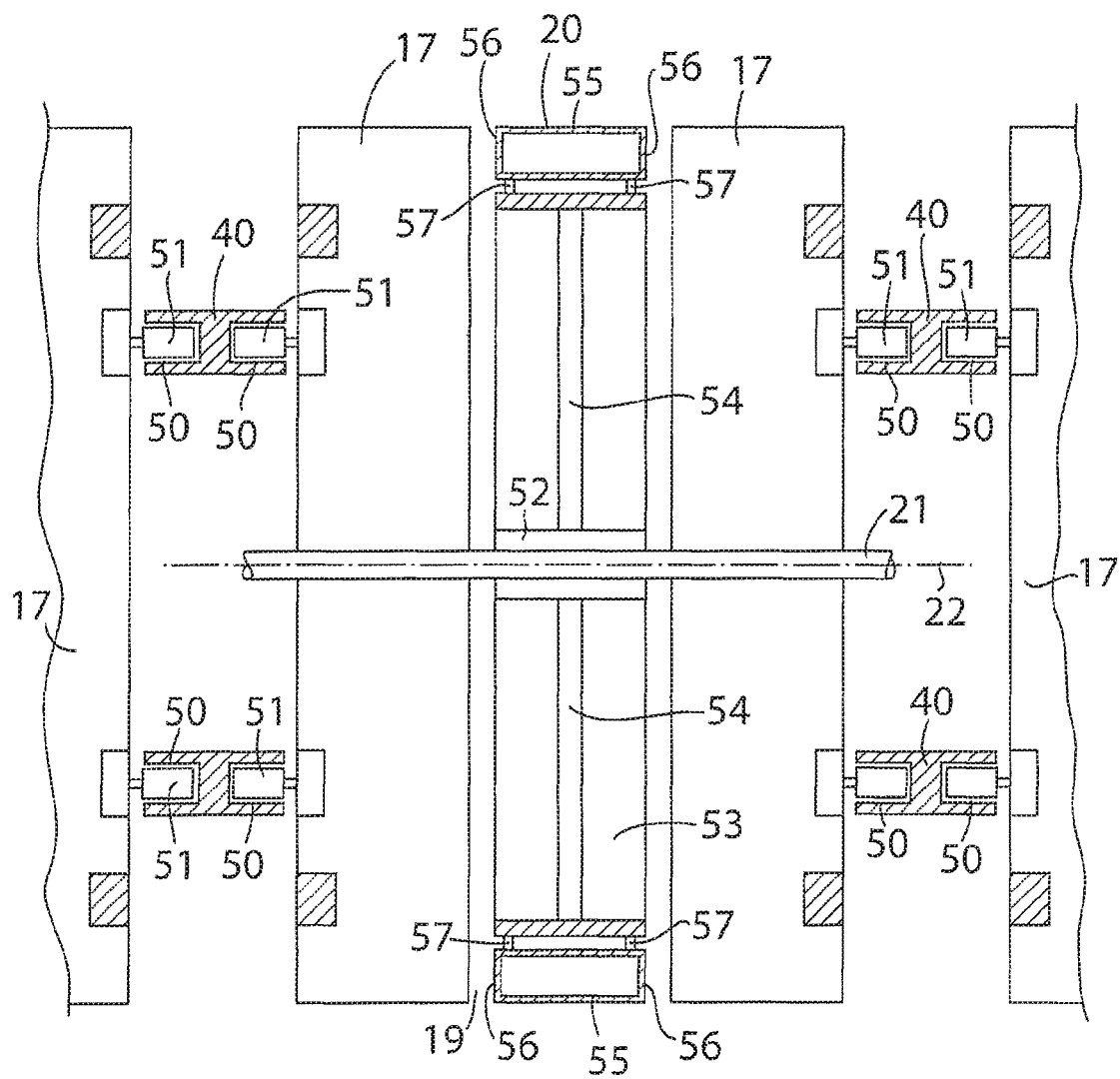
Figure 9:
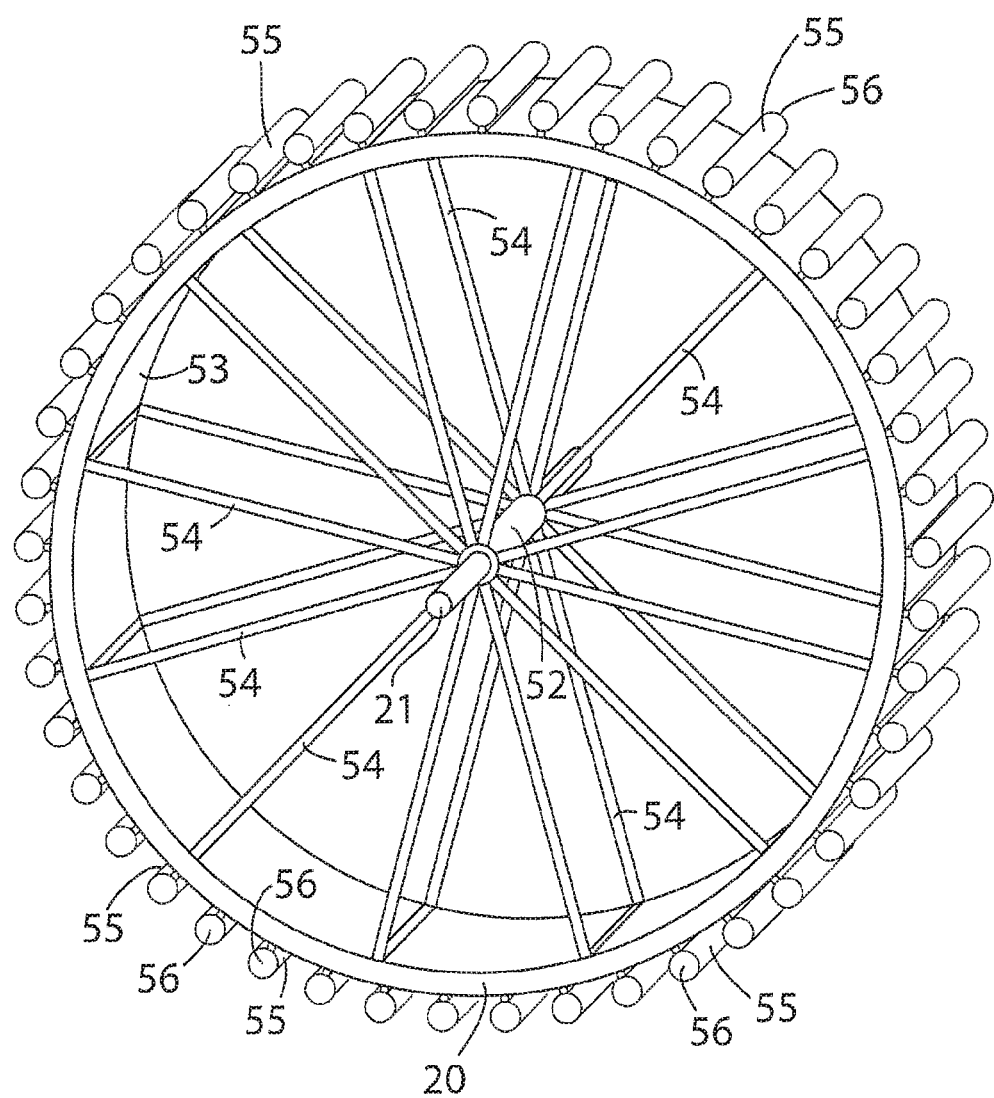
Figures 12, 13:
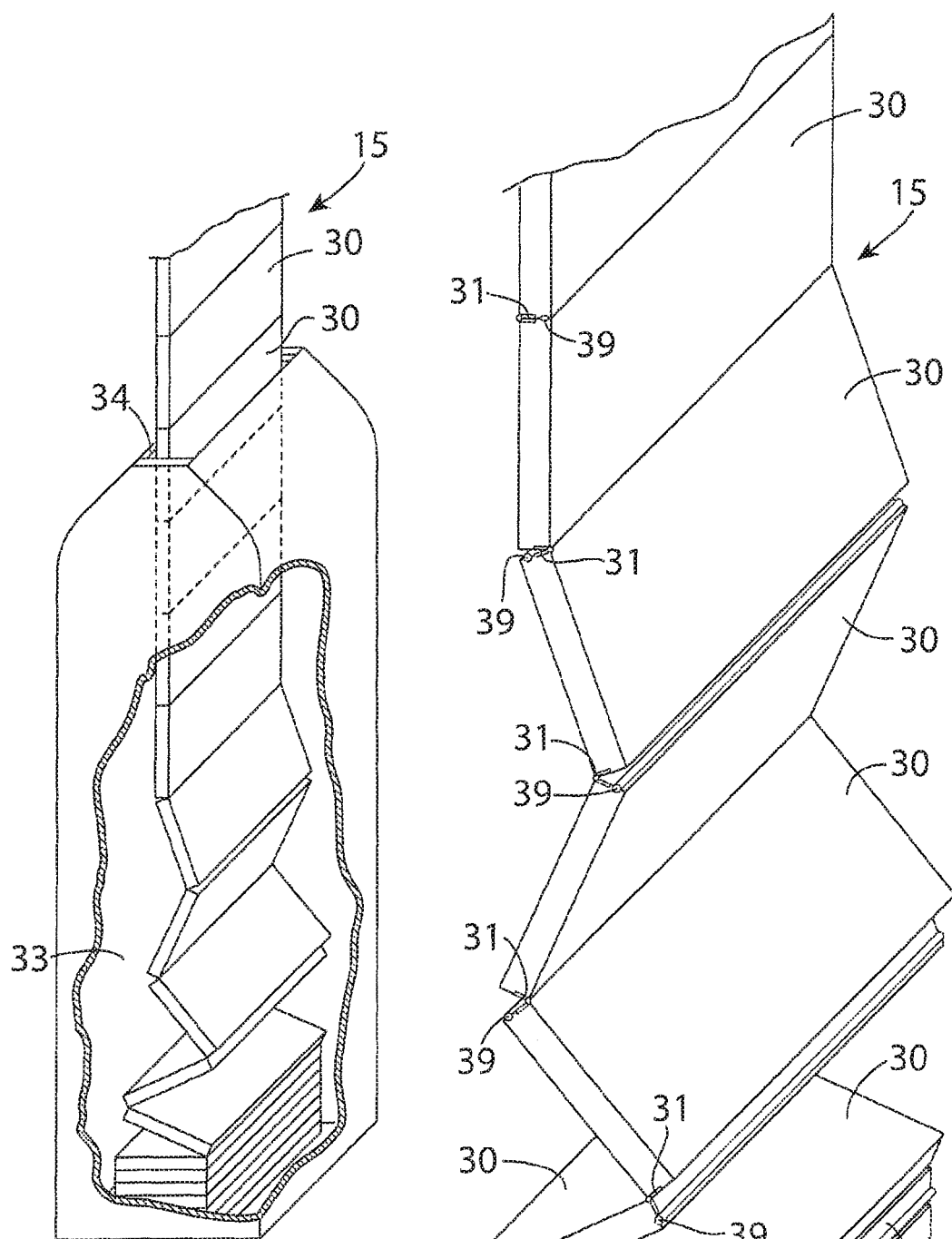
Figure 16:
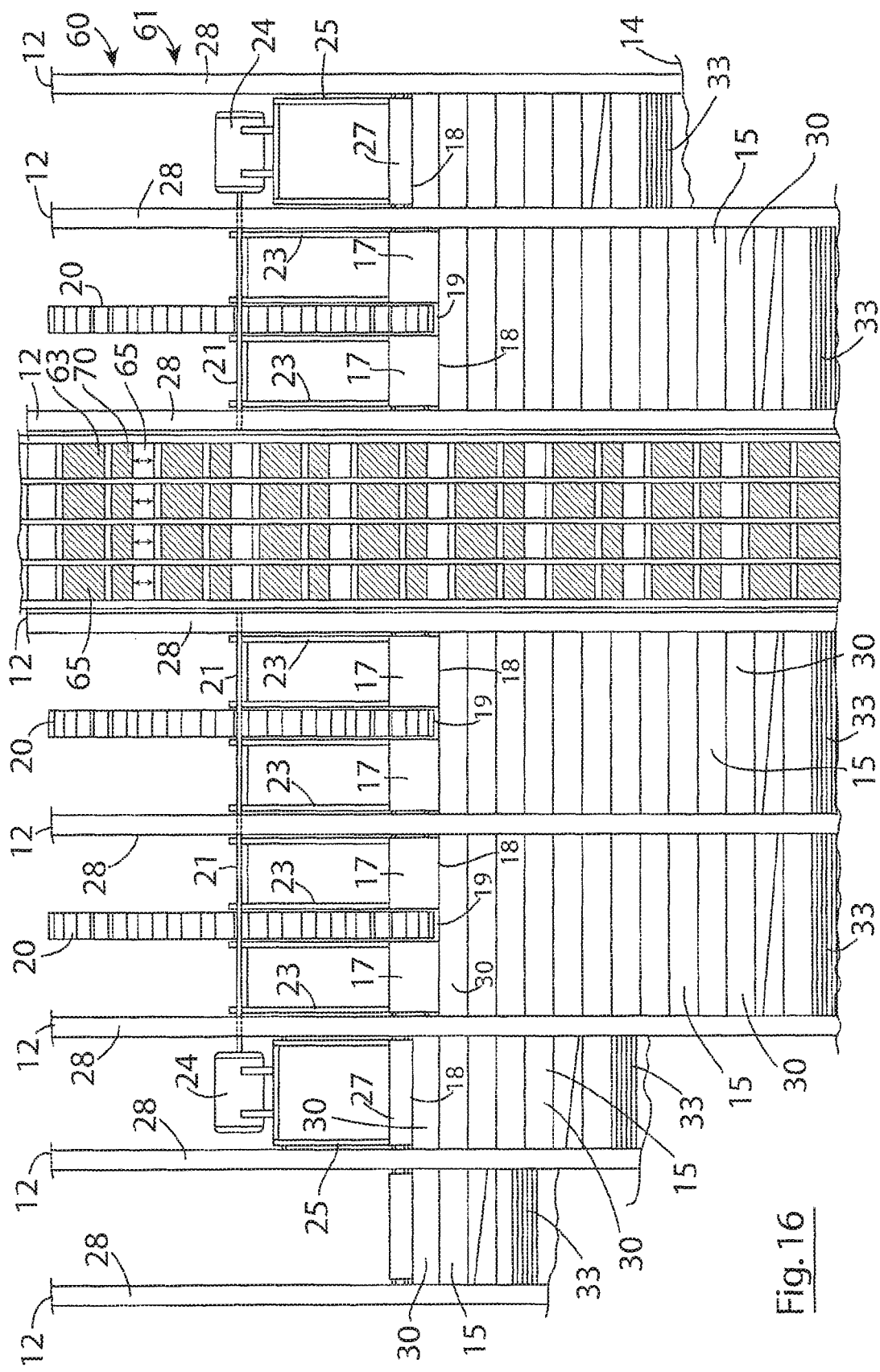
Figure 17:
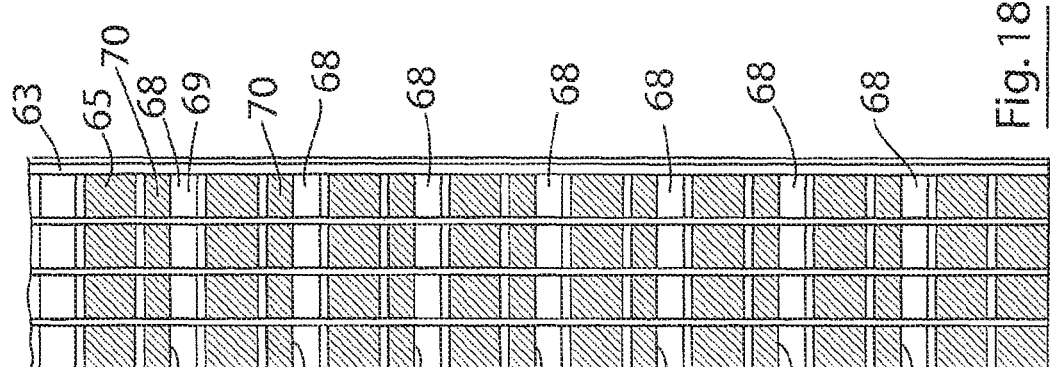
Figure 18:
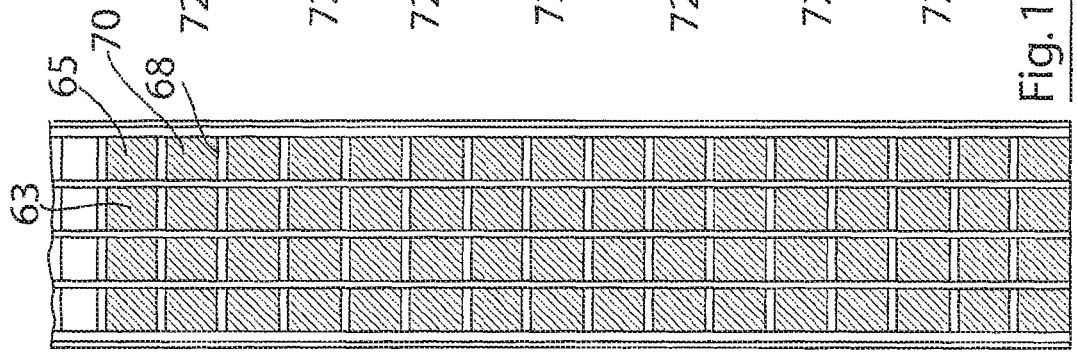
Figure 19:
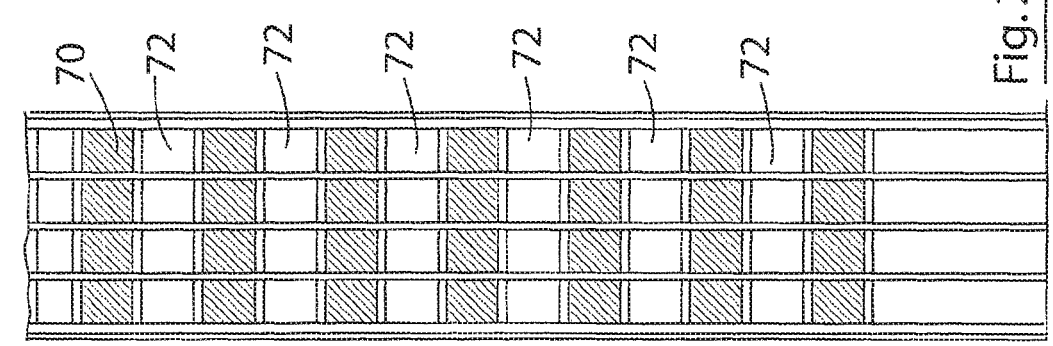
Figure 20:
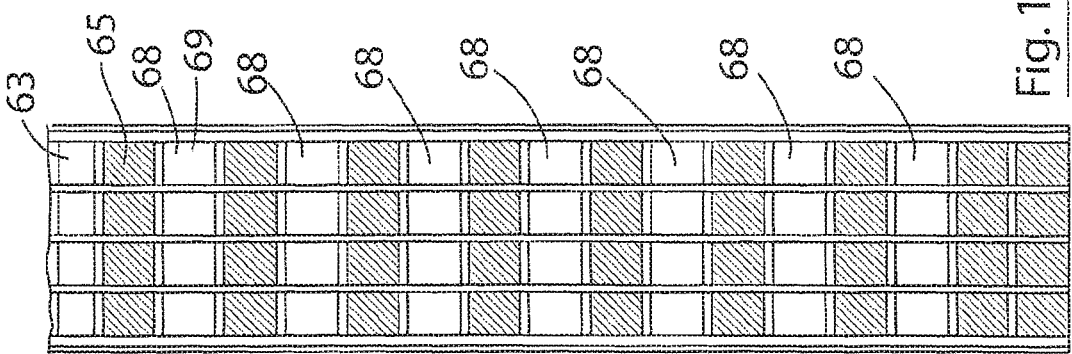
Figure 24:
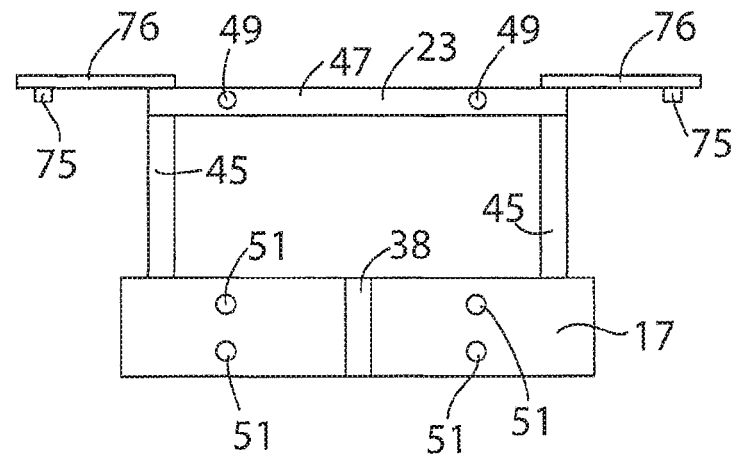
Figure 25:
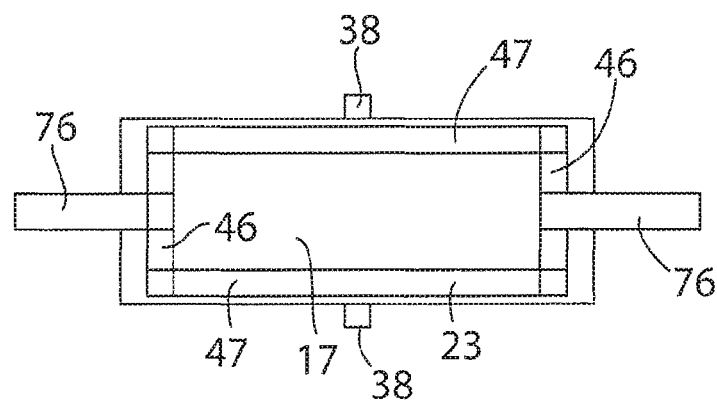
Figure 26:
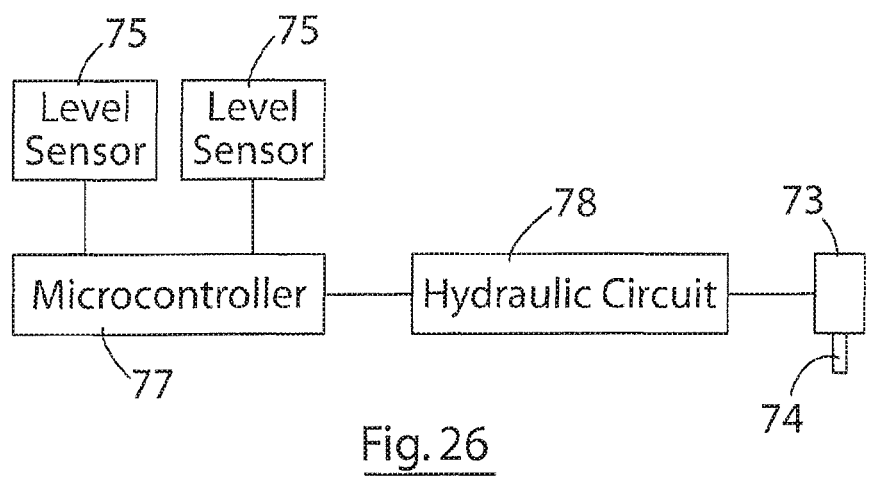

The invention will be more clearly understood from the following description of some preferred embodiments thereof, which are given by way of example only, with reference to the accompanying drawings, in which:

FIG. 1 is a diagrammatic top plan view of a sea estuary comprising an energy generating system according to the invention for generating energy from a sea tide, FIG. 2 is a front elevational view of the energy generating system of FIG. 1, FIG. 3 is an end elevational view of the energy generating system of FIG. 1, FIG. 4 is a perspective view of a portion of the energy generating system of FIG. 1, FIG. 5 is an end elevational view of a portion of the energy generating system of FIG. 1, FIG. 6 is a perspective view of a part of the portion of FIG. 5, FIG. 7 is a perspective view of a detail of the energy generating system of FIG. 1, FIG. 8 is a top plan view of the portion of the energy generating system of FIG. 5, FIG. 9 is a perspective view of a detail of the portion of FIG. 5 of the energy generating system of FIG. 1, FIG. 10 is a perspective view of a detail of the energy generating system of FIG. 1, FIG. 11 is a perspective view of another detail of the energy generating system of FIG. 1, FIG. 12 is a perspective view of another detail of the energy generating system of FIG. 1, FIG. 13 is an enlarged perspective view of a portion of the detail of FIG. 12 of the energy generating system of FIG. 1, FIG. 14 is a cross-sectional top plan view of a detail of the energy generating system of FIG. 1, FIG. 15 is a perspective view of a portion of the energy generating system of FIG. 1, FIG. 16 is a front elevational view of an energy generating system according to another embodiment of the invention, FIG. 17 is a front elevational view of a portion of the energy generating system of FIG. 16, FIG. 18 is a view similar to FIG. 17 of the portion of FIG. 15 of the energy generating system of FIG. 16 in a different state, FIG. 19 is a view similar to FIG. 17 of the portion of FIG. 17 in a further different state to that of FIG. 18, FIG. 20 is a front elevational view of another portion of the energy generating system of FIG. 16, FIG. 21 is a side elevational view of the portion of FIG. 17 of the energy generating system of FIG. 16, FIG. 22 is an end elevational view of the portion of FIG. 17 of the energy generating system of FIG. 16 but in a different state to that of FIG. 21, FIG. 23 is a top plan view of the portion of FIG. 17 of the energy generating system of FIG. 16, FIG. 24 is a side elevational view of another portion of the energy generating system of FIG. 16, FIG. 25 is a top plan view of the portion of FIG. 24 of the energy generating system of FIG. 16, and FIG. 26 is a circuit diagram of a control system of the energy generating system of FIG. 16.

Referring to the drawings, and initially to FIGS. 1 to 15 thereof, there is illustrated an energy generating system according to the invention, indicated generally by the reference numeral 1, for generating useable energy, in this case electrical energy from a sea tide. The energy generating system 1 comprises a dam 3 also according to the invention, which extends across an estuary 5 from a bank 6 of land 7 defining the estuary 5 to an opposite bank 8 of the land 7 so that the dam 3 defines with the land 7 a water containment area 10 in the estuary 5. Sea water on the seaward side 11 of the dam 3, on a rising tide flows over the dam 3 into the water containment area 10 where it is retained and slowly released back over the dam 3 to the sea on the seaward side 11 on a falling tide. The energy generating system 1 is configured so that on a rising tide water continuously flows over the dam 3 from the sea 11 into the water containment area 10, and electrical energy is continuously generated by the energy generating system 1, and on a falling tide water continuously flows over the dam 3 from the water containment area 10 to the sea 11, and electrical energy is also continuously generated by the energy generating system 1 as will be described below.

The dam 3 comprises a plurality of upstanding support members 12 embedded in the sea bed 14 and extending upwardly therefrom and spaced apart from each other across the estuary 5 from the bank 6 of the land 7 to the opposite bank 8 thereof. A plurality of variable height dam elements 15, which are described in more detail below, are located between respective adjacent pairs of the upstanding support members 12. Each dam element 15 is sealably engageable with its corresponding adjacent pair of upstanding support members 12 and is sealably slideable upwardly and downwardly within the adjacent pairs of upstanding support members 12 for varying the height of the dam element.

A main buoyancy means, in this embodiment of the invention a pair of spaced apart main buoyancy tanks 17 are located above each dam element 15 with an upper end 18 of the dam element 15 sealably coupled to the main buoyancy tanks 17 adjacent the underside thereof, as will be described below with reference to FIG. 15. Each main buoyancy tank 17 is coupled to the corresponding dam element 15 with the main buoyancy tank 17 extending substantially transversely of the dam element 15 and outwardly from the dam element 15 on respective opposite sides thereof, so that the main buoyancy tanks 17 are responsive to the higher level of the water on the seaward side 11 of the dam 3 and the water containment area 10, for rising and lowering the corresponding dam element 15 in response to rising and falling of the higher of the two water levels. Accordingly, on a rising tide, the main buoyancy tanks 17 rise the dam elements 15, assuming that the level of water of the rising tide on the seaward side 11 of the dam 3 is higher than the level of the water in the water containment area 10, and on a falling tide, the main buoyancy tanks 17 lower the dam elements 15 in response to the falling water level in the water containment area 10. The combined buoyancy of each pair of main buoyancy tanks 17 and the corresponding dam element 15 is such that the main buoyancy tanks 17 are partly submerged, and each pair of main buoyancy tanks 17 together with the upper end 18 of the corresponding dam element 15 define a water race 19 through which water flows from the sea into the water containment area 10 on a rising tide, and through which water flows on a falling tide from the water containment area to the sea. By virtue of the fact that the main buoyancy tanks 17 and the dam elements 15 follow the rise and fall of the respective water levels on the seaward side 11 of the dam 3 and the water containment areas 10, respectively, the volume of water flowing through the water races 19 remains substantially constant, during rising and falling of the tide.

A plurality of water wheels 20, one for each water race 19, are mounted fast on corresponding drive shafts 21 which define main rotational axes 22 of the respective water wheels 20. The drive shafts 21 are rotatably carried as will be described below on support means comprising respective pairs of support frameworks 23, which in turn are carried on the corresponding pairs of the main buoyancy tanks 17 of the respective dam elements 15. The support frameworks 23 are of height above the corresponding main buoyancy tanks 17, so that the water wheels 20 extend into the respective water races 19, so that water flowing through the water races 19 rotates the water wheels 20, and in turn the drive shafts 21. The drive shafts 21 of the respective water wheels are connected in series, with adjacent ones of the drive shafts 21 connected by flexible joints, in this embodiment of the invention provided by universal joints (not shown).

The endmost ones of the drive shafts 21 are coupled to respective electricity generators 24 which are mounted on carrier frameworks 25, which in turn are supported on secondary buoyancy tanks 27. The secondary buoyancy tanks 27 are mounted on corresponding dam elements 15 and extend transversely of the dam elements on respective opposite sides thereof in similar manner as the main buoyancy tanks 17 likewise extend on respective opposite sides of the dam elements 15, so that the secondary buoyancy tanks 27 are responsive to the water levels on the respective opposite sides of the dam 3 in similar manner as the main buoyancy tanks 17 are likewise responsive to the water levels on the respective opposite sides of the dam 3. The two dam elements are sealably secured to the underside of the corresponding secondary buoyancy tanks 27 in similar manner as the dam elements 15 are secured to the underside of the main buoyancy tanks 17. The main and secondary buoyancy tanks 17 and 27, and the support frameworks 23 and the carrier frameworks 25 are sized so that the main rotational axes 22 defined by the drive shafts 21 substantially coincide, and any minor height difference between adjacent ones of the drive shafts 21 is taken up by the universal joints (not shown) between the respective drive shafts 21.

Turning now to the upstanding support members 12, each upstanding support member 12 comprises a pair of spaced apart co-operating stanchions 28 of I-cross-section embedded in the sea bed, see FIGS. 3, 5 and 14. Each pair of stanchions 28 forming a corresponding upstanding support member 12 defines a main guide means, namely an elongated vertically extending main guide slot 29 between the adjacent stanchions 28 for guiding one end of the corresponding dam element 15 upwardly and downwardly as will be described below as the main and secondary buoyancy tanks 17 and 27 rise and fall in response to rising and falling water levels.

Turning now to the dam elements 15, each dam element 15 comprises a plurality of dam panels 30 hingedly connected in series, with adjacent ones of the dam panels 30 hingeadly coupled to each other by hinges 31 so that the dam panels 30 of each dam element 15 are operable in a concertina manner from an inoperative folded state with adjacent pairs of the dam panels 30 lying side by side parallel to each other to an operative state with the dam panels 30 aligned with each other and lying in a common vertically extending plane to form the corresponding dam element 15, see FIGS. 12 and 13. The dam panels 30 of the respective dam elements 15 are stored in the folded state in respective chambers 33 recessed into the sea bed 14 of the estuary 5 which extend between the corresponding adjacent pairs of upstanding support members 12. Panel accommodating slots 34 from the respective chambers 33 accommodate the dam panels 30 out of and into the chambers 33 as the dam elements 15 are being urged upwardly and downwardly by the main and secondary buoyancy tanks 17 and 27. Seals (not shown) in the respective slots 34 sealably engage the panels 30 for preventing the ingress of sea water into the chambers 33.

Main sealing means comprising longitudinally extending elongated main seals 35 extend the length of the stanchions 28 of each upstanding support member 12, and extend into the corresponding main guide slot 29 thereof for slideably and sealably engaging the dam panels 30 on each side thereof of the corresponding dam element 15 in the main guide slots 29 formed between the adjacent pairs of stanchions 28 to form substantially watertight seals between the main dam elements 15 and the corresponding pair of stanchions 28, see FIG. 14. Elongated engagement elements 38 extending the height of the main buoyancy tanks 17 and the secondary buoyancy tanks 27 slideably engage the corresponding main guide slots 29 between the corresponding adjacent pair of stanchions 28 of the adjacent corresponding upstanding support members 12. The engagement elements 38 are slideably and sealably engaged by the main seals 35 to form a substantially watertight seal between the main and secondary buoyancy tanks 17 and 27 and the corresponding pair of stanchions 28, see FIGS. 5 and 7.

Secondary sealing means comprising elongated secondary seals 39 are provided between adjacent pair of dam panels 30 of each dam element 15, so that when the panels 30 are in the operative state, the adjacent dam panels 30 of each dam element 15 are substantially watertight, thereby further ensuring the watertightness of the dam 3, see FIG. 13.

The dam panels 30 of the dam elements 15 are weighted so that they are biased downwardly from the operative state to the folded state under gravity as the main and secondary buoyancy tanks 17 and 27 fall in response to the falling water level.

Adjustable coupling means, namely, respective pair of chains 36, couple the upper most dam panel 30 at the upper end 18 of the respective dam elements 15 to the corresponding ones of the main and secondary buoyancy tanks 17 and 27, as the case may be, so that the dam elements 15 may be lowered downwardly below the main and secondary buoyancy tanks 17 and 27, in order to release water from one side of the dam 3 to the other side thereof in the event of an excessive water level differential between the water levels on the respective opposite sides of the dam 3. The chains 36 are wound onto winch drums 37 of respective winches 43 for raising and lowering the dam elements 15 relative to the main and secondary buoyancy tanks 17 and 27, see FIG. 15. Although the chains 36 and the winches 43 are illustrated on the main buoyancy tanks 17 in FIG. 15 only, similar chains and winches are provided on the secondary buoyancy tanks 27 for attaching the corresponding dam elements 15 to the secondary buoyancy tanks 27. When each dam element 15 has been raised fully by the chains 36 and the winches 43 to its corresponding pair of main buoyancy tanks 17 or its corresponding secondary buoyancy tank 27, the dam panel 30 adjacent the upper end 18 of the dam element 15 is sealably engaged to the corresponding pair of main buoyancy tanks 17 or the corresponding secondary buoyancy tank 27, as the case may be, by seals (not shown) on the underside of the main and secondary buoyancy tanks 17 and 27.

The stanchions 28 of each upstanding support member 12 are reinforced by respective pairs of spaced apart upstanding reinforcing members, namely inner reinforcing members 40 and outer reinforcing members 41 also of I cross-section embedded in the sea bed 14 and located in the water containment area 10 and on the seaward side of the corresponding upstanding support member 12. Reinforcing struts 42 extend between the stanchions 28 and the inner reinforcing members 40, and between the inner and outer reinforcing members 40 and 41, in order to maintain the spacing between the stanchions 28 defining the corresponding main guide slot 29 constant along the length of the corresponding upstanding support member 12.

Turning now to the support frameworks 23 which are mounted on the main buoyancy tanks 17, and which rotatably support the drive shafts 21, the support frameworks 23 each comprise two pairs of upstanding frame members 45 which extend upwardly from the corresponding main buoyancy tank 17 towards the respective opposite ends thereof, and which are joined by cross-members 46 and transverse members 47. Plummerblock bearings 48 mounted on the transverse members 47 of each support framework 23 rotatably carry the corresponding drive shaft 21. The water wheels 20 are located on the drive shafts 21 between adjacent pairs of the support frameworks 23.

Guide bearings 49 mounted on the outer ones of the transverse members 47 of each pair of the support frameworks 23 are rollably engageable in secondary guide means, namely, in corresponding guide channels 50 defined by the corresponding upstanding inner reinforcing members 40 to the seaward side 11 and to the water containment area side of the dam 3 for guiding the support framework 23 upwardly and downwardly in response to the rising and falling of the water levels. Guide bearings 51 mounted on the outer side of each main buoyancy tank 17 of each pair thereof similarly rollably engage the channels 50 of the inner reinforcing members 40 for guiding the main buoyancy tanks 15 upwardly and downwardly in response to the rising and falling water levels.

Guide bearings (not shown) similar to the guide bearings 49 and 51 are provided on the carrier frameworks 25 and on the secondary buoyancy tanks 27, respectively, which support the electricity generators 24, for rollably engaging the channels 50 of the corresponding ones of the inner reinforcing members 40, for in turn guiding the carrier frameworks 25 and the corresponding secondary buoyancy tanks 27 upwardly and downwardly in response to the rising and falling water levels.

Turning now to the water wheels 20, each water wheel 20 comprises a hub 52 mounted fast on the corresponding drive shaft 21 and a circular peripheral rim 53 carried on the hub 52 by spoke 54, see FIGS. 5 and 9. A plurality of water engaging elements, namely, cylindrical tubes 55 are located equi-spaced apart circumferentially around the external periphery of the peripheral rim 53 of each water wheel 20 and are connected to the peripheral rim 53 by pairs of spaced apart connecting members 57 extending radially from the peripheral rim 53. Each cylindrical tube 55 is of length substantially the width of the corresponding water race 19 defined between the corresponding adjacent pairs of main buoyancy tanks 17. The cylindrical tubes 55 are closed at their respective opposite ends by end caps 56, and define respective hollow interior regions which are evacuated to a pressure below atmospheric pressure for enhancing the conversion of flowing energy in the water through the corresponding water race 19 into rotational energy of the water wheel 20. The external diameter of the cylindrical tubes 55 will be dependent on the depth of water expected to flow through the water races 19. It is envisaged that the cylindrical tubes 55 will be set on the peripheral rim 53 of each water wheel 20 by the connecting members 57, so that the cylindrical tubes 55 pass through the corresponding water race 19 at a depth below the level of the water in the corresponding water race 19 of between 7 mm and 10 mm.

As discussed above, the drive shafts 21 extend across the dam 3, and adjacent drive shafts 21 are connected to each other by universal joints (not shown). The drive shafts 21 are rotatably carried in the plummerblock bearings 48 mounted on the support frameworks 23. The two end most drive shafts 21 are connected to the electricity generator 24 for driving the generator 24 to produce electricity in response to the rotation of the water wheels 20. Cables (not shown) from the electricity generators 24 distribute electricity therefrom.

In use, assuming the water level in the water containment area 10 is low, the main and secondary buoyancy tanks 17 and 27 rise in response to a rising tide, once the level of the water on the seaward side 11 of the dam 3 exceeds the level of the water in the water containment area 10, thereby rising the dam elements 15. As the dam elements 15 rise, the dam panels 30 of the dam elements 15 are drawn from the corresponding chambers 33 and transition from the inoperative folded state to the operative state. As main and secondary buoyancy tanks 17 and 27 rise the dam elements 15, the water races 19 defined between the corresponding pairs of the main buoyancy tanks 17 and the corresponding dam elements 15 also rise with the main buoyancy tanks 17. The water wheels 20 are maintained at a constant level in the water races 19 by virtue of the fact that the support frameworks 23 rise with the main buoyancy tanks 17. Thus, as the water level of the rising tide rises, above the water level in the water containment area 10, the main and secondary buoyancy tanks 17 and 27 rise and water flows from the sea 11 through the water races 19 into the water containment area 10, thereby rotating the water wheels 20 in a clockwise or an anticlockwise direction, depending from which side the water wheels 20 are being viewed. The rotating water wheels 20 drive the electricity generator through the drive shafts 21, thereby generating electricity. Additionally, since the carrier frameworks 25 rise with the secondary buoyancy tanks 27, the electricity generators 24 are maintained substantially aligned with the rotational axes 22 of the drive shafts 21. As the water from the rising tide flows through the water races 19, the level of water in the water containment area 10 rises.

On the turn of the tide, the water level on the seaward side 11 of the dam 3 commences to fall relative to the water level in the water containment area 10. When the water level of the falling tide falls below the level of water in the water containment area 10, water commences to flow from the water containment area 10 back to the sea 11 through the water races 19, thereby rotating the water wheels 20 in the opposite direction to that in which the water wheels 20 were rotating in response to the rising tide. As the water level in the water containment area 10 commences to fall, the main and secondary buoyancy tanks 17 and 27 fall in response to the falling water level in the water containment area 10, for so long as the water level in the water containment area 10 is above the level of the water on the seaward side 11 of the dam 3, thereby maintaining the rotational axes 22 of the drive shafts 21 and the electricity generators 24 substantially aligned, and maintaining the water flowing through the water races 19 from the water containment area 10 to the sea for rotating the water wheel 20. Additionally, the falling main buoyancy tanks 17 maintain the water wheels 20 in the water races 19. As the main and secondary buoyancy tanks 17 and 27 fall, the dam panels 30 of the dam elements 15 slide downwardly under the force of gravity in the main guide slots 29 defined between the corresponding pairs of stanchions 28. The lower dam panels 30 of the dam elements 15 enter the corresponding chambers 33 through the slots 34 and transition from the operative state into the folded state within the corresponding chambers 33.

As the water wheels 20 rotate, the drive shafts 21 are rotated by the water wheels the same direction as the water wheels 20, and drive from the drive shafts 21 is transmitted to the electricity generators 24 for driving the generators 24 for in turn generating electricity.

It has been found that by providing the water engaging cylindrical tubes 55 as evacuated tubes decreases the energy required to rotate the water wheel.

Referring now to FIGS. 16 to 26 there is illustrated an energy generating system according to another embodiment of the invention indicated generally by the reference numeral 60, also for generating electricity from a sea tide. The energy generating system 60 comprises a dam also according to the invention and indicated generally by the reference numeral 61 extending across a tidal estuary. The energy generating system 60 and the dam 61 are substantially similar to the energy generating system 1 and the dam 3 described with reference to FIGS. 1 to 15, and similar components are identified by the same reference numerals. The main difference between the energy generating system 60 and the energy generating system 1 lies in the dam 61.

In this embodiment of the invention the dam 61 comprises a means for controlling the water level differential between the water levels on the respective opposite sides of the dam 3. The means for controlling water level differential comprises a sluice means, namely, a sluice 63 which comprises first and second sluice panels 65 and 66 respectively, which extend between an adjacent pair of the upstanding support members 12. The first and second sluice panels 65 and 66 are spaced apart from each other and extend parallel to each other upwardly from the sea bed 14. The first and second sluice panels 65 and 66 are sealably secured to the corresponding pairs of stanchions 28 of the respective upstanding support members 12. A plurality of rectangular shaped first and second sluice openings 68 and 69 respectively, extend through the first and second sluice panels 65 and 66. The first and second sluice openings 68 and 69 are vertically equi-spaced apart in the first and second sluice panels 65 and 66, with the first sluice openings 68 in the first sluice panel 65 aligned with the second sluice openings 69 in the second sluice panel 66.

A closure means in this embodiment of the invention comprising a closure panel 70 is located between the first and second sluice panels 65 and 66 and is provided with a plurality of rectangular communicating openings 72 extending therethrough, which are equi-spaced apart vertically in the closure panel 70. The communicating openings 72 are of substantially similar size to the first and second sluice openings 68 and 69, and the spacing of the communicating openings 72 from each other is substantially similar to the spacing between the first sluice openings 68 in the first sluice panel 65 and the spacing between the second sluice openings 69 in the second sluice panel 66. The closure panel 70 is slideable upwardly and downwardly between the first and second sluice panels 65 and 66 between a closed state illustrated in FIG. 21 with the closure panel closing the first and second sluice openings 68 and 69 of the first and second sluice panel 65 and 66, and an open state illustrated in FIG. 22, with the communicating openings 72 aligned with the first and second sluice openings 68 and 69 of the first and second sluice panels 65 and 66 for communicating the first and second sluice openings 68 and 69, for in turn accommodating water flow between the water containment area 10 and the sea for rapidly varying the water level differential between the water level in the water containment area 10 and the water level on the seaward side 11 of the dam 61.

An urging means for urging the closure panel 70 between the open and closed states may comprise any suitable urging means, for example, an electrically powered linear motor, an electrically powered rotary motor, an hydraulic or pneumatic ram, or an hydraulic or pneumatic motor. In this embodiment of the invention the urging means comprises an hydraulic ram 73 mounted on a mounting bracket extending across and between the first and second sluice panels 65 and 66 adjacent the top thereof. A piston rod 74 of the hydraulic ram 73 is connected to the closure panel 70 for operating the closure panel 70 between the open and closed states.

A monitoring means for monitoring the water levels on the respective opposite sides of the dam 61, in this embodiment of the invention comprises a pair of level sensors 75 mounted on brackets 76 extending outwardly from the cross-members 46 of one of the support frameworks 23 of one of the centremost dam elements 15 for monitoring the water levels on the respective opposite sides of the dam 61, see FIGS. 24 and 25. A control means, namely, an electronic controller comprising a microcontroller 77 reads signals from the level sensors 75 and computes the water level differential between the water levels on the respective opposite sides of the dam 61, see FIG. 26. The microcontroller 77 is programmed to operate the ram 73 through an hydraulic circuit 78 for urging the closure panel 70 from the closed state to the open state to permit flow of water from one side of the dam 61 to the other through the first and second sluice openings 68 and 69 in response to the water level differential exceeding a predefined water level differential value. The microcontroller 77 is programmed to maintain the closure panel 70 in the open state until the water level differential falls below the predefined water level differential value. Once the water level differential has fallen below the predefined water level differential value, the microcontroller 77 is programmed to operate the ram for in turn operating the closure panel 70 from the open state to the closed state, thus closing the first and second sluice openings 68 and 69 and preventing further flow of water through the sluice 63. The predefined water level differential value is selected to limit the water level differential between the water levels on the respective sides of the dam 61 to a value which the dam elements 15 can withstand without any danger to their integrity, and to avoid any danger of damage to the dam 61 or to any other part thereof.

In use, the operation of the energy generating system and the dam 61 is similar to that already described with reference to the energy generating system 1 and dam 3 described with reference to FIGS. 1 to 15, with the exception that should the microcontroller 77 determine from signals read from the level sensors 75 that the water level differential of the water level on the respective opposite sides of the dam 61 exceeds the predefined water level differential value, the microcontroller 77 operates the ram 73 for urging the closure panel 70 from the closed to the open state. The microcontroller 77 retains the ram 73 powered with the closure panel 70 in the open state until the water level differential falls below the predefined water level differential value. At which stage, the microcontroller 77 operates the ram 73 for urging the closure panel 70 from the open state to the closed state. The microcontroller 77 retains the ram 73 powered for retaining the closure panel 70 in the closed state until the water level differential again exceeds the predefined water level differential value.

Otherwise, the energy generating system 60 and the dam 61 and their operation are similar to the energy generating system 1 and dam 3 and their operation.

Since the energy generating system of FIGS. 16 to 26 has been described as comprising a single sluice means, it is envisaged that more than one sluice means may be provided, in which case, the sluice means would be provided at spaced apart intervals across the dam.

Additionally, since the energy generating system described with reference to FIGS. 16 to 26 has been described as comprising the sluice means, it is envisaged that the dam elements may be non-adjustably secured to the main and secondary buoyancy tanks, in which case, the topmost one of the dam panels would be rigidly secured to the corresponding one of the main and secondary buoyancy tanks, and the winch and chain connection could be dispensed with.

It is also envisaged that a water level differential monitoring means may be provided on the energy generating system described with reference to FIGS. 1 to 15 for monitoring the water level differential on the respective opposite sides of the dam. In which case, a control circuit would also be provided, and the winches could be motor driven for raising or lowering the dam elements relative to the main and secondary buoyancy tanks depending on the water level differential. For example, in normal operation the dam elements would be sealably secured to the main and secondary buoyancy tanks, and in the event of the water level differential monitoring means detecting the water level differential on the respective opposite sides of the dam exceeding the predefined water level differential value, the motor driven winches would be operated for lowering the dam elements in order to allow water to flow rapidly from the side of the dam with the higher water level to the side of the dam with the lower water level in order to reduce the water level differential to the predefined water level differential value. Once the monitored water level differential was reduced to the predefined water level differential value, the winch motors would again be operated to raise the dam elements to sealably secure the dam elements to the corresponding main and secondary buoyancy tanks.

While the water level differential monitoring means has been described as comprising a pair of water level sensors which detect the physical level of the water on respective opposite sides of the dam, it is envisaged that any other suitable water level differential monitoring means may be provided, for example, pressure transducers, located on the sea bed on the respective opposite sides of the dam.

While specific constructions of support frameworks and carrier frameworks have been described, and while specific constructions of main and secondary buoyancy tanks have been described, any other suitable main and secondary buoyancy tanks and indeed buoyancy means and any other suitable support frameworks and carrier frameworks may be provided. Indeed, in some embodiments of the invention, it is envisaged that each dam element would be provided with a single buoyancy means, for example, a buoyancy tank having a channel shaped recess extending from one side to the other, which would define the water race. It is also envisaged that in certain embodiments of the invention the water race may extend into one or more of the upper ones of the dam panels of each dam element.

It will also of course be appreciated that any other suitable upstanding support members besides those described may be provided.

While each water wheel has been described as being of a specific construction, any other suitable constructions of water wheel may be used. Indeed, it is envisaged that in certain cases the water engaging means of each water wheel may comprise a plurality of conventional water wheel paddles equi-spaced apart circumferentially around the peripheral rim and extending radially outwardly therefrom instead of the water engaging tubular elements. Furthermore, where water engaging tubular elements are provided on the peripheral rim of the water wheel, the tubular members need not necessarily be evacuated to a pressure below atmospheric pressure, and whether evacuated or otherwise may be of any other shape than cylindrical.

While each water wheel has been described as mounted fast on a drive shaft, and the drive shaft of the water wheels have been described as being connected in series by universal joints, in certain embodiments of the invention, it is envisaged that one single elongated drive shaft may be provided on which the water wheels would be mounted fast spaced apart from each other. In which case, it is envisaged that the support frameworks would be rigidly joined together so that all the support frameworks moved in tandem. It is also envisaged that the carrier frameworks on which the electricity generators are carried may also be rigidly connected to the support frameworks, and in which case, the single drive shaft to which the water wheels are mounted fast would drive the respective electricity generators directly.

The invention claimed is:

1. An energy generating system for generating energy from a sea tide comprising:
   a dam configured to isolate a water containment area from a sea, the dam comprising:
     at least one variable height dam element, each dam element being configured to define a water race between the water containment area and the sea to allow water flow therethrough between the sea and the water containment area, and comprising a plurality of dam panels hingeadly connected in series and moveable in a concertina manner between an inoperative folded state with the dam panels lying side by side and parallel to each other and an operative state with the dam panels substantially aligned with each other to form the dam element,
   a buoyancy means co-operable with each dam element and configured to control the height of the corresponding dam element in response to a level of water, and
   a water wheel operably located in each water race configured to produce usable energy.

2. An energy generating system as claimed in claim 1 in which each buoyancy means is configured to progressively rise the corresponding dam element in response to a rising tide.

3. An energy generating system as claimed in claim 1 in which at least one main guide means is configured to guide each dam element in a generally upwardly and downwardly direction.

4. An energy generating system as claimed in claim 1 in which the dam panels of each dam element are configured to be progressively drawn from the folded state into the operative state in response to upward movement of the corresponding buoyancy means, and the dam panels are progressively returned from the operative state to the folded state in response to downward movement of the corresponding buoyancy means.

5. An energy generating system as claimed in claim 1 in which each water wheel is configured to rotate in one direction in response to a rising tide, and to rotate in the opposite direction in response to a falling tide.

6. An energy generating system as claimed in claim 1 in which a plurality of water races are defined by a plurality of corresponding dam elements, and the water wheel of each dam element is mounted fast on a drive shaft rotatably supported on the buoyancy means of the corresponding dam element, the drive shafts of the water wheels of the respective dam elements being coupled in series to an electricity generator.

7. An energy generating system as claimed in claim 1 in which a sluice means is provided for selectively permitting water to flow through the dam bypassing the one or more water races.

8. An energy generating system as claimed in claim 1 in which each buoyancy means is configured to progressively lower the corresponding dam element in response to a falling water level of the water in the water containment area.

9. An energy generating system as claimed in claim 1 in which a pair of spaced apart upstanding support members are provided extending upwardly from a sea bed for supporting each dam element therebetween, and a main sealing means is provided for forming a seal between each dam element and the corresponding upstanding support members.

10. An energy generating system as claimed in claim 9 in which each dam element and the corresponding buoyancy means are configured to move relative to the pair of upstanding support members.

11. An energy generating system as claimed in claim 1 in which the dam panels of each dam element are weighted to return to the folded state under gravity, in response to downward movement of the corresponding buoyancy means.

12. An energy generating system as claimed in claim 1 in which the dam panels of each dam element are stored in the folded state in a corresponding chamber.

13. An energy generating system as claimed in claim 12 in which the chamber of each dam element in which the dam panels thereof are stored in the folded state is located adjacent the sea bed.

14. An energy generating system as claimed in claim 3 in which the dam panels of each dam element are sealably and slideably engageable in the corresponding main guide means.

15. An energy generating system for generating energy from a sea tide comprising:
a dam configured to isolate a water containment area from a sea, the dam comprising:
at least one variable height dam element, each dam element being configured to define a water race between the water containment area and the sea to allow water flow therethrough between the sea and the water containment area,
a buoyancy means co-operable with each dam element and configured to control the height of the corresponding dam element in response to a level of water,
a water wheel operably located in each water race configured to produce usable energy, and
a sluice means for selectively permitting water to flow through the dam bypassing the one or more water races.

16. An energy generating system as claimed in claim 15 in which the sluice means is located in the dam.

17. An energy generating system for generating energy from a sea tide comprising:
a dam configured to isolate a water containment area from a sea, the dam comprising:
at least one variable height dam element, each dam element being configured to define a water race between the water containment area and the sea to allow water flow therethrough between the sea and the water containment area,
a buoyancy means co-operable with each dam element and configured to control the height of the corresponding dam element in response to a level of water, and
a water wheel operably located in each water race configured to produce usable energy, each water wheel comprising a plurality of circumferentially spaced apart water engaging elements defining respective hollow interior regions evacuated to a pressure below atmospheric pressure, the water engaging elements of each water wheel being located on the water wheel and being configured to extend into the corresponding water race.

18. An energy generating system as claimed in claim 15 in which the sluice means comprises a sluice panel having at least one sluice opening extending therethrough, and a closure means operable between a closed state closing the at least one sluice opening and an open state permitting water to flow through the at least one sluice opening, and a water level differential monitoring means for monitoring the water level differential on respective opposite sides of the dam is provided, the closure means being urged into the open state in response to the monitored water level differential exceeding a predefined water level differential value.

19. An energy generating system as claimed in claim 17 in which the water engaging elements of each water wheel are equi-spaced apart circumferentially around the periphery of the corresponding water wheel.

20. A method for generating energy from a sea tide, the method comprising:
providing a dam to form a water containment area separated from the sea by the dam,
locating at least one variable height dam element in the dam, each dam element comprising the plurality of the hingeadly connected dam panels, the dam panels of each dam element being moveable in a concertina manner between a folded state with the dam panels lying side by side and parallel to each other and an operative state with the dam panels substantially aligned with each other to form the dam element,
coupling the dam element to a buoyancy means for controlling the height of the dam element in response to a level of water,
configuring the dam element to define a water race between the water containment area and the sea to allow water to flow therethrough between the sea and the water containment area, and locating a water wheel in the water race to rotate in response to water flowing through the water race to produce useable energy.

\* \* \* \* \*